United States Patent
Oishi et al.

(10) Patent No.: US 10,478,724 B2
(45) Date of Patent: Nov. 19, 2019

(54) GAME DEVICE, PROCESSING METHOD, AND INFORMATION STORAGE MEDIUM

(71) Applicant: BANDAI NAMCO ENTERTAINMENT INC., Tokyo (JP)

(72) Inventors: Yuki Oishi, Tokyo (JP); Tetsuo Takahashi, Tokyo (JP); Yosuke Kadowaki, Tokyo (JP); Masumi Yamamoto, Tokyo (JP); Shuichi Ogasawara, Tokyo (JP); Yoshihito Yano, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 295 days.

(21) Appl. No.: 15/388,216

(22) Filed: Dec. 22, 2016

(65) Prior Publication Data

US 2017/0182414 A1    Jun. 29, 2017

(30) Foreign Application Priority Data

Dec. 29, 2015 (JP) ................. 2015-257582

(51) Int. Cl.

| | |
|---|---|
| *A63F 13/428* | (2014.01) |
| *A63F 13/537* | (2014.01) |
| *A63F 13/40* | (2014.01) |
| *A63F 13/424* | (2014.01) |
| *A63F 13/44* | (2014.01) |

(Continued)

(52) U.S. Cl.
CPC ............ *A63F 13/428* (2014.09); *A63F 13/40* (2014.09); *A63F 13/42* (2014.09); *A63F 13/424* (2014.09); *A63F 13/44* (2014.09); *A63F 13/537* (2014.09); *A63F 13/213* (2014.09); *A63F 13/426* (2014.09)

(58) Field of Classification Search
CPC .... A63F 13/428; A63F 13/213; A63F 13/537; A63F 13/40; A63F 13/42; A63F 13/424; A63F 13/426; A63F 13/44
See application file for complete search history.

(56) References Cited

U.S. PATENT DOCUMENTS 5,900,849 A * 5/1999 Gallery ............... G06F 3/011
                                                    273/148 B
7,628,699 B2 * 12/2009 Onoda ............... A63F 13/10
                                                    463/36

(Continued)

FOREIGN PATENT DOCUMENTS

| JP | H05-304646 A | 11/1993 |
|---|---|---|
| JP | 2013-164737 A | 8/2013 |

*Primary Examiner* — William H McCulloch, Jr.
(74) *Attorney, Agent, or Firm* — Oliff PLC

(57) ABSTRACT

A game device includes a processor including hardware, the processor being configured to implement: an input process that acquires line-of-sight information about a player who wears a head-mounted display, and input information that has been input by the player using an input device; a game process that performs a first game process based on the input information, and performs a second game process based on the line-of-sight information, when a game includes a first game and a second game, the first game process being a process for the player to play the first game, and the second game process being a process for the player to play the second game; and a game result calculation process that calculates a game result achieved by the player based on a result of the first game process and a result of the second game process.

18 Claims, 25 Drawing Sheets

(51) Int. Cl.
*A63F 13/42* (2014.01)
*A63F 13/213* (2014.01)
*A63F 13/426* (2014.01)

(56) References Cited

U.S. PATENT DOCUMENTS

| | | | | |
|---|---|---|---|---|
| 7,722,450 | B2* | 5/2010 | Onoda | A63F 13/10 463/7 |
| 7,909,698 | B2* | 3/2011 | Onoda | A63F 13/10 463/36 |
| 8,439,753 | B2* | 5/2013 | Wakitani | A63F 13/06 463/36 |
| 9,884,248 | B2* | 2/2018 | Koseki | A63F 13/212 |
| 10,183,220 | B2* | 1/2019 | Tamaoki | A63F 13/537 |
| 2001/0038378 | A1* | 11/2001 | Zwern | G09B 9/00 345/156 |
| 2009/0013052 | A1* | 1/2009 | Robarts | G06Q 10/107 709/206 |
| 2009/0219224 | A1* | 9/2009 | Elg | H04S 7/304 345/8 |
| 2012/0068913 | A1* | 3/2012 | Bar-Zeev | G02B 26/026 345/8 |
| 2012/0295708 | A1* | 11/2012 | Hernandez-Abrego | G06F 3/167 463/36 |
| 2013/0021373 | A1* | 1/2013 | Vaught | G02B 27/017 345/633 |
| 2013/0083003 | A1* | 4/2013 | Perez | G06F 3/005 345/419 |
| 2014/0184550 | A1* | 7/2014 | Hennessey | G06F 3/013 345/173 |
| 2014/0335950 | A1* | 11/2014 | Sugiue | A63F 13/67 463/31 |
| 2014/0361977 | A1* | 12/2014 | Stafford | G02B 27/0093 345/156 |
| 2014/0364212 | A1* | 12/2014 | Osman | A63F 13/213 463/31 |
| 2015/0078621 | A1* | 3/2015 | Choi | G09G 5/14 382/103 |
| 2015/0352437 | A1* | 12/2015 | Koseki | A63F 13/212 463/31 |
| 2016/0171704 | A1* | 6/2016 | Raghoebardajal | H04N 13/122 345/633 |
| 2016/0187974 | A1* | 6/2016 | Mallinson | G06F 3/014 463/32 |
| 2016/0287994 | A1* | 10/2016 | Tamaoki | A63F 13/537 |
| 2017/0059871 | A1* | 3/2017 | Hashiba | G02B 27/0179 |
| 2017/0076503 | A1* | 3/2017 | Tamaoki | G06T 19/006 |
| 2017/0182414 | A1* | 6/2017 | Oishi | A63F 13/428 |
| 2018/0032131 | A1* | 2/2018 | Yasuda | G06F 3/01 |

* cited by examiner

FIG. 17A
| ADA | |
|---|---|
| MUSICAL COMPOSITION (GENRE) | AFFINITY PARAMETER |
| MS1 | AFA1 |
| MS2 | AFA2 |
| MS3 | AFA3 |
| ⋮ | ⋮ |
| ADB | |
|---|---|
| MUSICAL COMPOSITION (GENRE) | AFFINITY PARAMETER |
| MS1 | AFB1 |
| MS2 | AFB2 |
| MS3 | AFB3 |
| ⋮ | ⋮ |
FIG. 17B
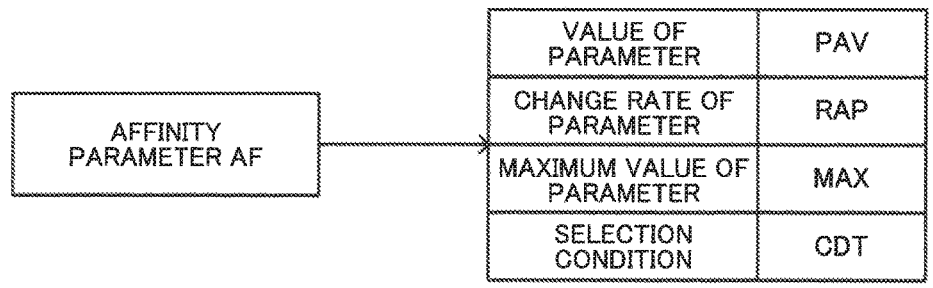
FIG. 17C
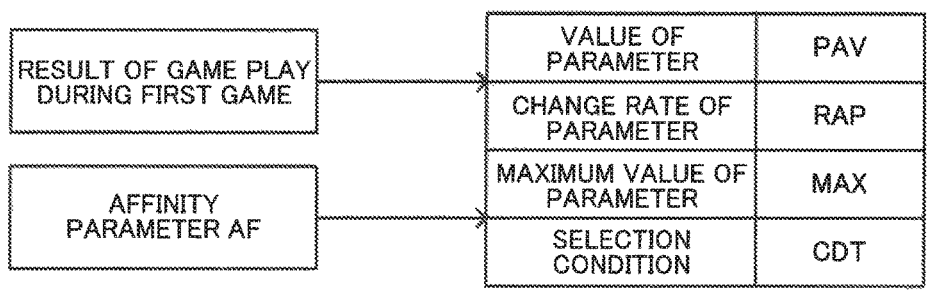

BALLADE

ROCK

GAME DEVICE, PROCESSING METHOD, AND INFORMATION STORAGE MEDIUM

Japanese Patent Application No. 2015-257582 filed on Dec. 29, 2015, is hereby incorporated by reference in its entirety.

BACKGROUND

The present invention relates to a game device, a processing method, an information storage medium, and the like.

A device is known that is designed so that the user (player) wears a head-mounted display (HMD) on the head, and watches an image displayed on the screen of the HMD to experience a virtual reality (VR) world. For example, JP-A-5-304646 and JP-A-2013-164737 disclose technology that relates to such a device.

Since a game that utilizes an HMD can display a vast VR space over and around the entire field of view of the player, it is possible to allow the player to experience remarkably improved virtual reality.

However, a game process that is suitable for a game that utilizes an HMD has not yet been proposed. A game play rating (evaluation) system that is appropriate for a game that utilizes an HMD has also not been proposed.

SUMMARY

According to one aspect of the invention, there is provided a game device comprising:

a processor comprising hardware, the processor being configured to implement:

an input process that acquires line-of-sight information about a player who wears a head-mounted display, and input information that has been input by the player using an input device;

a game process that performs a first game process based on the input information, and performs a second game process based on the line-of-sight information, when a game includes a first game and a second game, the first game process being a process for the player to play the first game, and the second game process being a process for the player to play the second game; and a game result calculation process that calculates a game result achieved by the player based on a result of the first game process and a result of the second game process.

According to another aspect of the invention, there is provided a processing method comprising:

an input process that acquires line-of-sight information about a player who wears a head-mounted display, and input information that has been input by the player using an input device;

a game process that performs a first game process based on the input information, and performs a second game process based on the line-of-sight information, when a game includes a first game and a second game, the first game process being a process for the player to play the first game, and the second game process being a process for the player to play the second game; and a game result calculation process that calculates a game result achieved by the player based on a result of the first game process and a result of the second game process.

According to another aspect of the invention, there is provided a computer-readable information storage medium storing a program that causes a computer to execute the processing method as defined in claim 17.

BRIEF DESCRIPTION OF THE DRAWINGS

FIGS. 16A to 16D are views illustrating a method hat changes the value, change rate, maximum value, and the like of a parameter of a target based on gaze time information, gaze distance information, and the like.

FIG. 17A to 17C are views illustrating a process that utilizes an affinity parameter with respect to a target, a musical composition, and the like.

DESCRIPTION OF EXEMPLARY EMBODIMENTS

Figure 1:
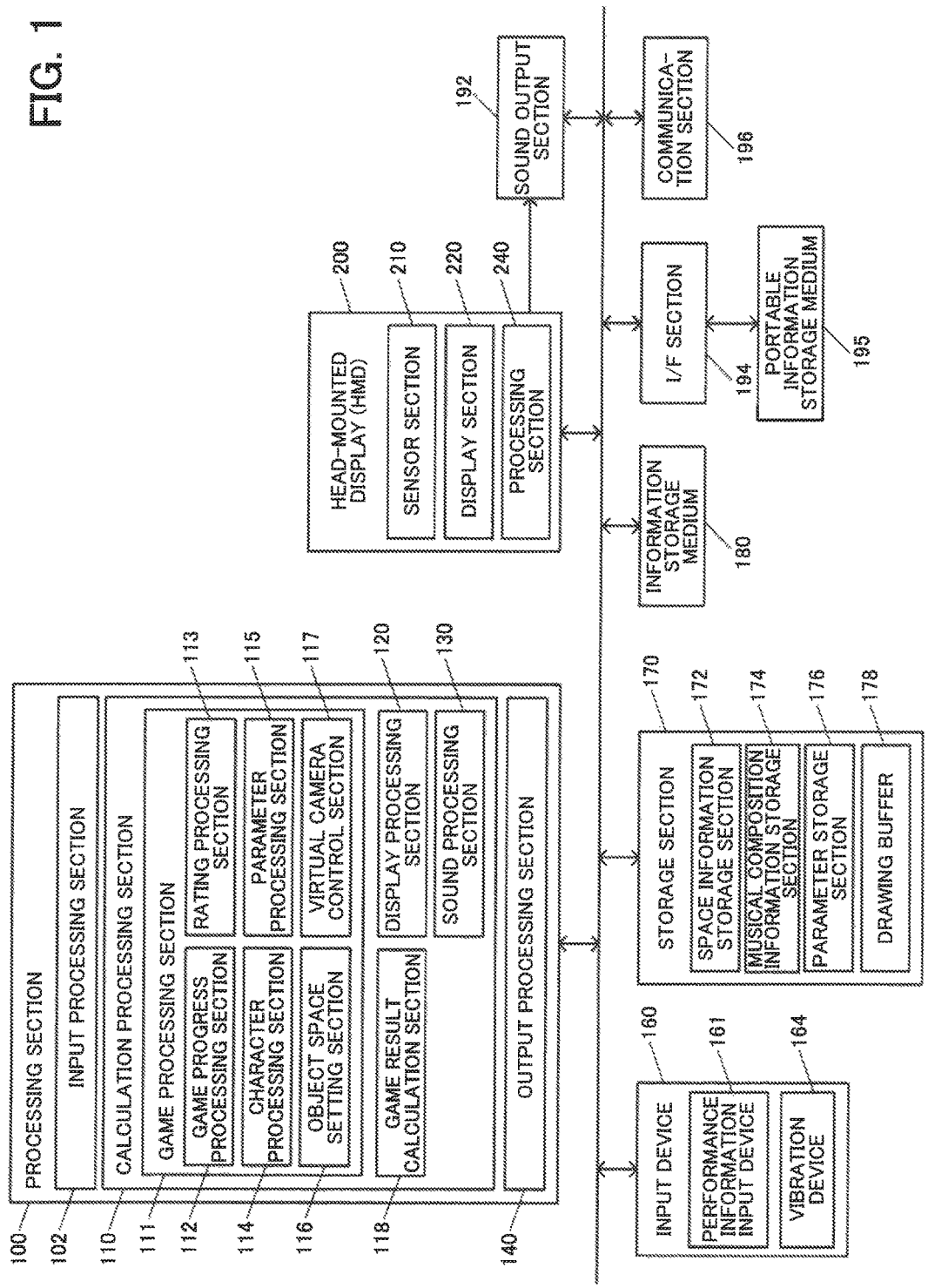
FIG. 1 illustrates a configuration example of a game device according to one embodiment of the invention.

Several aspects of the invention may provide a game device, a processing method, an information storage medium, and the like that can implement a game process that is suitable for a game that utilizes a head-mounted display.

According to one embodiment of the invention, there is provided a game device comprising:

a processor comprising hardware, the processor being configured to implement:

an input process that acquires line-of-sight information about a player who wears a head-mounted display, and input information that has been input by the player using an input device;

a game process that performs a first game process based on the input information, and performs a second game process based on the line-of-sight information, when a game includes a first game and a second game, the first game process being a process for the player to play the first game, and the second game process being a process for the player to play the second game; and a game result calculation process that calculates a game result achieved by the player based on a result of the first game process and a result of the second game process.

According to the game device, the line-of-sight information about the player who wears the head-mounted display, and the input information that has been input by the player using the input device, are acquired. The game includes the first game and the second game. The first game process that is a process for the player to play the first game is performed based on the input information, and the second game process that is a process for the player to play the second game is performed based on the line-of-sight information. The game result achieved by the player is then calculated based on the result of the first game process and the result of the second game process. According to this configuration, when implementing a game that utilizes a head-mounted display, the player can play the first game by means of the first game process based on the input information from the input device, and can also play the second game by means of the second game process based on the line-of-sight information about the player. The game result achieved by the player is calculated based on the result of the first game process and the result of the second game process. This makes it possible to implement a game process that is suitable for a game that utilizes a head-mounted display.

In the game device, wherein the first game may be a timing input game in which the game process is performed based on the input information.

According to this configuration, the player can play the timing input game (i.e., first game) by means of the first game process based on the input information, and can also play the second game by means of the second game process based on the line-of-sight information about the player. This makes it possible to implement a novel timing input game.

In the game device, wherein the second game may be a game in which the game process is performed based on line-of-sight relationship information that represents a relationship between a line of sight of the player and a target.

According to this configuration, the player can play the first game based on the input information, and can also play the second game that determines the relationship between the line of sight of the player and the target. This makes it possible to implement a novel game.

In the game device, wherein the second game may be a game in which the game process is performed based on the line-of-sight relationship information that represents a relationship between the line of sight of the player and a spectator that is the target.

According to this configuration, the player can play the first game, and can also play the second game that determines the relationship between the line of sight of the player and the spectator.

In the game device, wherein the processor may implement the game process that performs a first rating process that rates game play performed by the player during the first game, and a second rating process that rates game play performed by the player during the second game, and may implement the game result calculation process that calculates the game result achieved by the player based on a result of the first rating process and a result of the second rating process.

According to this configuration, the game play performed by the player during the first game based on the input information can be rated (evaluated) by the first rating process, the game play performed by the player during the second game based on the line-of-sight information can be rated by the second rating process, and the game result achieved by the player can be calculated based on the result of the first rating process and the result of the second rating process.

In the game device, wherein the processor may implement the game process that performs the second rating process that rates the game play performed by the player during the second game based on line-of-sight relationship information that represents a relationship between a line of sight of the player and a target, and an input state of the input information by the player during the first game.

According to this configuration, it is possible to rate the game play performed by the player during the second game by determining the relationship between the line of sight of the player and the target, and determining the input state of the input information by the player during the first game.

In the game device, wherein the processor may implement the game process that performs the second rating process that rates the game play performed by the player during the second game based on line-of-sight relationship information that represents a relationship between a line of sight of the player and a target, and motion information about the player.

According to this configuration, it is possible to rate the game play performed by the player during the second game by determining the relationship between the line of sight of the player and the target, and determining the motion information about the player.

In the game device, wherein the processor may implement the game process that performs a process that changes a value of a parameter that is set to a target with respect to a line of sight of the player based on a result of the game play performed by the player during the second game, and may calculate the result of the second rating process based on at least one of the value of the parameter and a number of the targets for which the parameter has reached a given value.

According to this configuration, it is possible to implement the second rating process during the second game by changing the value of the parameter of the target based on the result of the game play performed by the player during the second game, and utilizing the value of the parameter, and the number of targets for which the parameter has reached a given value.

In the game device,
wherein the processor may implement the game process that performs the first rating process that rates the game play performed by the player during the first game based on at least one of a pitch and a rhythm that are determined based on performance information about the player, the performance information being the input information.

According to this configuration, it is possible to rate the game play performed by the player during the first game by determining the pitch or the rhythm determined based on the performance information about the player.

In the game device,
wherein the processor may implement the game process that performs a process that changes a value of a parameter that is set to a target with respect to a line of sight of the player based on a result of game play performed by the player during the second game.

According to this configuration, it is possible to change the value of the parameter of the target based on the result of the game play performed by the player during the second game, and implement various processes that utilize the value of the parameter.

In the game device,
wherein the processor may implement the game process that performs a process that changes at least one of the value of the parameter, a change rate of the parameter, a maximum value of the parameter, and a selection condition for the target based on a result of game play performed by the player during the first game.

According to this configuration, it is possible to implement various processes by variously changing the value of the parameter of the target, the change rate of the parameter, the maximum value of the parameter, and the selection condition for the target corresponding to the result of the game play performed by the player during the first game.

In the game device,
wherein a process that selects the target may be performed during the second game, and
the processor may implement the game process that performs a process that changes at least one of the value of the parameter, the change rate of the parameter, and the maximum value of the parameter based on the result of the game play performed by the player during the first game after the target has been selected.

According to this configuration, it is possible to implement various processes by variously changing the value of the parameter of the target, the change rate of the parameter, and the maximum value of the parameter corresponding to the result of the game play performed by the player during the first game after the target has been selected during the second game.

In the game device,
wherein the processor may implement the game process that performs a process that changes at least one of the value of the parameter, the change rate of the parameter, and the maximum value of the parameter based on at least one of gaze time information that represents a time for which the player gazes at the target, gaze distance information that represents a distance between the player and the target when the player gazes at the target, and selection timing information about the target.

According to this configuration, it is possible to change the value of the parameter of the target, the change rate of the parameter, or the maximum value of the parameter while reflecting the gaze time information, the gaze distance information, and the selection timing information about the target.

In the game device,
wherein an affinity parameter may be set between a musical composition that is used during the first game, or an input state of the input information during the first game, and the target with respect to the line of sight of the player, and
the processor may implement the game process that performs a process that changes at least one of the value of the parameter, a change rate of the parameter, a maximum value of the parameter, and a selection condition for the target based on the affinity parameter.

According to this configuration, it is possible to change the value of the parameter of the target, the change rate of the parameter, the maximum value of the parameter, or the selection condition for the target while reflecting the affinity parameter between the musical composition used during the first game, or the input state of the input information during the first game, and the target.

In the game device,
wherein an affinity parameter may be set between a musical composition that is used during the first game, or an input state of the input information during the first game, and a target with respect to a line of sight of the player, and
the processor may implement a display process that displays the affinity parameter in an identifiable manner.

According to this configuration, when the affinity parameter has been set between the musical composition used during the first game, or the input state of the input information during the first game, and the target, it is possible to allow the player to visually determine the affinity parameter.

In the game device,
wherein the processor may implement the game process that performs a process that, when the player has played one of the first game and the second game in a state in which a failure determination has not been made, and then started playing the other of the first game and the second game, increases at least one of a value of a parameter and a change rate of the parameter in the other of the first game and the second game.

According to this configuration, when the player has played one of the first game and the second game in a state in which a failure determination has not been made, and then started playing the other of the first game and the second game, the value of the parameter or the change rate of the parameter in the other of the first game and the second game is increased. Therefore, it is possible to implement a situation in which the value of the parameter increases in a chain-like manner during the first game and the second game.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

FIG. 1 illustrates a configuration example of a game device (image generation device or game system) according to one embodiment of the invention. Note that the configuration of the game device according to one embodiment of the invention is not limited to the configuration illustrated in FIG. 1. Various modifications may be made, such as omitting some of the elements (sections), or providing an additional element.

An input device 160 is a device that allows the player to input various types of input information. The input device 160 may include a performance information input device 161 and a vibration device 164. The input device 160 may have a function of a game controller that allows the player to input game operation information. The game controller is implemented by an operation button, a direction key, a joystick, a lever, or the like, for example. In this case, the game controller and the performance information input device 161 may be implemented using an identical housing, or may be implemented using different housings.

The performance information input device 161 is a device that allows the player to input performance information. For example, when the music game that is implemented according to one embodiment of the invention is a game in which the player sings, vocal performance information is input using the input device 160. The performance information input device 161 is implemented by a microphone 162 described later with reference to FIG. 2A, for example. When the music game that is implemented according to one embodiment of the invention is a game in which the player plays a musical instrument, musical instrument performance information is input using the input device 160. The performance information input device 161 may be implemented by a musical instrument such as a stringed instrument (guitar), a percussion instrument (drum), or a keyboard (piano or keyboard), or a device that imitates such a musical instrument.

The vibration device 164 (vibration generation section) is a device that produces vibrations that give an alarm or the like. For example, the vibration device 164 is implemented by a vibrating motor (vibrator) or the like. The vibrating motor produces vibrations by rotating an eccentric weight, for example. More specifically, an eccentric weight is attached to each end of a drive shaft so that the motor shakes. Note that the vibration device 164 is not limited to a vibrating motor. For example, the vibration device 164 may be implemented by a piezo element or the like.

A storage section 170 stores various types of information. The storage section 170 functions as a work area for a processing section 100, a communication section 196, and the like. A game program and game data necessary for executing the game program are stored in the storage section 170. The function of the storage section 170 may be implemented by a semiconductor memory (DRAM or VRAM), a hard disk drive (HDD), an SDD, an optical disk device, or the like. The storage section 170 includes a space information storage section 172, a musical composition information storage section 174, a parameter storage section 176, and a drawing buffer 178.

An information storage medium 180 (computer-readable medium) stores a program, data, and the like. The function of the information storage medium 180 may be implemented by an optical disk (DVD, BD, or CD), an HDD, a semiconductor memory (ROM), or the like. The processing section 100 performs various processes according to one embodiment of the invention based on a program (data) stored in the information storage medium 180. Specifically, a program that causes a computer (i.e., a device that includes an input device, a processing section, a storage section, and an output section) to function as each section according to one embodiment of the invention (i.e., a program that causes a computer to execute the process of each section) is stored in the information storage medium 180.

A head-mounted display (hereinafter appropriately referred to as "HMD") 200 is a device that is worn on the head of the player, and displays an image in front of the player. It is desirable that the HMD 200 be a non-see-through HMD. Note that the HMD 200 may be a see-through HMD. The HMD 200 may be an eyeglass-type HMD.

The HMD 200 includes a sensor section 210, a display section 220, and a processing section 240. Note that a light-emitting device may be provided to the HMD 200. The sensor section 210 is used to implement a tracking process (e.g., head tracking process). For example, the position and the direction of the HMD 200 are determined by the tracking process that is implemented using the sensor section 210. The viewpoint position and the line-of-sight direction of the player can be determined by determining the position and the direction of the HMD 200.

Various tracking methods may be used to implement the tracking process. When a first tracking method (i.e., tracking method) is used, a plurality of light-receiving devices (e.g., photodiodes) are provided as the sensor section 210 (as described in detail later with reference to FIGS. 2A and 2B). The plurality of light-receiving devices receive light (e.g., laser light) emitted from a light-emitting device (e.g., LED) that is provided outside to determine the position and the direction of the HMD 200 (i.e., the head of the player) within the three-dimensional space in the real world. When a second tracking method is used, a plurality of light-emitting devices (LED) are provided to the HMD 200 (as described in detail later with reference to FIGS. 3A and 3B). Light emitted from each of the plurality of light-emitting devices is captured using an imaging section that is provided outside to determine the position and the direction of the HMD 200. When a third tracking method is used, a motion sensor is provided as the sensor section 210, and the position and the direction of the HMD 200 are determined using the motion sensor. The motion sensor may be implemented by an acceleration sensor, a gyro sensor, or the like. For example, the position and the direction of the HMD 200 within the three-dimensional space in the real world can be determined by utilizing a hexaxial motion sensor that uses a triaxial acceleration sensor and a triaxial gyro sensor. Note that the position and the direction of the HMD 200 may be determined by a combination of the first tracking method and the second tracking method, a combination of the first tracking method and the third tracking method, or the like.

The display section 220 included in the HMD 200 may be implemented by a liquid crystal display (LCD), an organic EL display, or the like. For example, a first display that is placed in front of the left eye of the player, and a second display that is placed in front of the right eye of the player, are provided to the HMD 200 as the display section 220 so that stereoscopic display can be implemented. Stereoscopic display may be implemented by generating a left-eye image and a right-eye image that differ in disparity (parallax), displaying the left-eye image on the first display, and displaying the right-eye image on the second display.

The processing section 240 included in the HMD 200 performs various processes necessary for the HMD 200. For example, the processing section 240 performs a control process that controls the sensor section 210, a display control process that controls the display section 220, and the like. The processing section 240 also performs a three-dimensional audio (stereophonic) process to reproduce the three-dimensional sound direction, distance, and range. Specifically, the processing section 240 performs a process that controls the sound field within the three-dimensional space.

The sound obtained by the three-dimensional audio process is output to a sound output section 192 that is implemented by a headphone or the like through a headphone terminal provided to the HMD 200.

The sound output section 192 outputs a sound generated according to one embodiment of the invention. The sound output section 192 may be implemented by a headphone, a speaker that is provided to a television or an audio device, or the like.

An I/F (interface) section 194 performs an interface process that interfaces with a portable information storage medium 195. The function of the I/F section 194 may be implemented by an I/F processing ASIC or the like. The portable information storage medium 195 allows the user to store various types of information. The portable information storage medium 195 is a storage device that can hold the information even when the supply of power has been stopped. The portable information storage medium 195 may be implemented by an IC card (memory card), a USB memory, a magnetic card, or the like.

The communication section 196 communicates with the outside (e.g., another device) through a cable or wireless network. The function of the communication section 196 may be implemented by hardware (e.g., communication ASIC or communication processor) or communication firmware.

A program (data) that causes a computer to function as each section according to one embodiment of the invention may be distributed to the information storage medium 180 (or the storage section 170 or the portable information storage medium 195) from an information storage medium included in a server (host device) through a network and the communication section 196. Use of the information storage medium included in the server (host device) is also intended to be included within the scope of the invention.

The processing section 100 (processor) performs a game process, a game result calculation process, a display process, a sound process, and the like based on input information from the input device 160, tracking information (i.e., the position and the direction of the HMD, or the viewpoint position and the line-of-sight direction) about the HMD 200, a program, and the like.

Each process (function) according to one embodiment of the invention that is performed (implemented) by each section of the processing section 100 may be implemented by a processor (i.e., a processor including hardware). For example, each process according to one embodiment of the invention may be implemented by a processor that operates based on information (e.g., program), and a memory that stores information (e.g., program). The function of each section of the processor may be implemented by individual hardware, or may be implemented by integrated hardware, for example. For example, the processor may include hardware, and the hardware may include at least one of a circuit that processes a digital signal and a circuit that processes an analog signal. For example, the processor may include (may be implemented by) one or a plurality of circuit devices (e.g., IC) or one or a plurality of circuit elements (e.g., resistor or capacitor) that are mounted on a circuit board. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The processor may include an amplifier circuit, a filter circuit, and the like that process an analog signal. The memory (storage section 170) may be a semiconductor memory (e.g., SRAM or DRAM), or may be a register. The memory may be a magnetic storage device such as a hard disk drive (HDD), or may be an optical storage device such as an optical disk device. For example, the memory stores a computer-readable instruction, and the process (function) of each section of the processing section 100 is implemented by causing the processor to execute the instruction. The instruction may be an instruction set that is included in a program, or may be an instruction that instructs the hardware circuit included in the processor to operate.

The processing section 100 includes an input processing section 102, a calculation processing section 110, and an output processing section 140. The calculation processing section 110 includes a game processing section 111, a game result calculation section 118, a display processing section 120, and a sound processing section 130. Each process according to one embodiment of the invention that is implemented by each section included in the processing section 100 may be implemented by a processor (or a processor and a memory) (see above). Note that various modifications may be made, such as omitting some of the elements (sections), or providing an additional element.

The input processing section 102 performs a process (i.e., input process) that receives the input information and the tracking information, a process (i.e., input process) that reads information from the storage section 170, and a process (reception process) (i.e., input process) that receives information through the communication section 196. For example, the input processing section 102 performs a process (i.e., input process) that acquires the input information that has been input by the player using the input device 160, and the tracking information (e.g., position information and line-of-sight information about the player) detected by the sensor section 210 included in the HMD 200, or the like, a process (i.e., input process) that reads information designated by a readout instruction from the storage section 170, and a process (i.e., input process) that receives information from an external device (e.g., server or another game device) that is provided outside the game device through a network. The reception process includes a process that instructs the communication section 196 to receive information, a process that acquires information received by the communication section 196, and writes the acquired information into the storage section 170, and the like.

The calculation processing section 110 performs various calculation processes. For example, the calculation processing section 110 performs the game process, the game result calculation process, the display process, the sound process, and the like.

The game processing section 111 (program module that implements the game process) performs various game processes that are necessary for the player to play the game. The game processing section 111 includes a game progress processing section 112, a rating processing section 113, a character processing section 114, a parameter processing section 115, an object space setting section 116, and a virtual camera control section 117.

The game progress processing section 112 performs a process that starts the game when a game start condition has been satisfied, a process that proceeds with the game, a process that terminates the game when a game termination condition has been satisfied, and the like. The rating processing section 113 performs a rating process that rates the game play performed by the player. For example, the rating processing section 113 performs a rating process that rates the performance of the player, and the game operation performed by the player during the music game. Musical composition information used for the music game is stored in the musical composition information storage section 174.

The character processing section 114 performs various character processes. For example, the character processing section 114 performs a process that moves a character in an object space (game space), and a process that causes a character to make a motion. For example, the process that causes a character to make a motion may be implemented by a motion process (e.g., motion reproduction process) that utilizes motion data. The parameter processing section 115 performs a process that calculates various parameters (game parameters) used for the game. For example, the parameter processing section 115 performs a process that increases or decreases each parameter value. Information about the parameters is stored in the parameter storage section 176.

The object space setting section 116 performs a process that sets the object space (virtual three-dimensional space) in which a plurality of objects are placed. For example, the object space setting section 116 performs a process that places an object (i.e., an object formed by a primitive surface such as a polygon, a free-form surface, or a subdivision surface) that represents a display object such as a character (e.g., human, animal, or robot), a map (geographical feature), a building, spectators' seats, a course (road), a tree, a wall, or a water surface in the object space. Specifically, the object space setting section 116 determines the position and the rotation angle (synonymous with orientation or direction) of the object in a world coordinate system, and places the object at the determined position (X, Y, Z) and the determined rotation angle (rotation angles around X, Y, and Z-axes). More specifically, information (i.e., space information) about the position, the rotation angle (direction), and the like of each of a plurality of objects (part objects) placed in the object space is stored in the space information storage section 172 included in the storage section 170. The object space setting section 116 performs a process that updates the space information every frame, for example.

The virtual camera control section 117 performs a process that controls a virtual camera (viewpoint or reference virtual camera) for generating an image viewed from a given (arbitrary) viewpoint in the object space. More specifically, the virtual camera control section 117 performs a process that controls the position (X, Y, Z) or the rotation angle (rotation angles around X, Y, and Z-axes) of the virtual camera (i.e., a process that controls the viewpoint position, the line-of-sight direction, or the angle of view). The virtual camera corresponds to the viewpoint of the player. A first viewpoint that corresponds to the left eye (first virtual camera that corresponds to the left eye), and a second viewpoint that corresponds to the right eye (second virtual camera that corresponds to the right eye) are set when implementing stereoscopic display.

The game result calculation section 118 performs a process that calculates the game result achieved by the player. For example, the game result calculation section 118 performs a process that calculates the game result (e.g., score or points) acquired by the game play performed by the player.

The display processing section 120 performs a process that displays a game image. For example, the display processing section 120 performs a drawing process based on the results of various processes (game process and simulation process) performed by the processing section 100 to generate an image, and displays the generated image on the display section 220 included in the HMD 200. More specifically, the display processing section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or a-value) based on the results of the geometric process. The display processing section 120 draws the object (one primitive surface, or a plurality of primitive surfaces) subjected to perspective transformation in a drawing buffer 178 (i.e., a buffer (e.g., frame buffer or work buffer) that can store image information on a pixel basis) based on the drawing data (primitive surface data). The display processing section 120 thus generates an image viewed from a virtual camera (i.e., given viewpoint (e.g., a first viewpoint that corresponds to the left eye, and a second viewpoint that corresponds to the right eye)) in the object space. The drawing process performed by the display processing section 120 may be implemented by a vertex shader process, a pixel shader process, and the like.

The sound processing section 130 performs a sound process based on the results of various processes performed by the processing section 100. More specifically, the sound processing section 130 generates a game sound (e.g., musical composition (music and background music (BGM)), effect sound, or voice), and outputs the generated game sound to the sound output section 192. Note that part (e.g., three-dimensional audio process) of the sound process performed by the sound processing section 130 may be implemented by the processing section 240 included in the HMD 200.

The output processing section 140 performs various information output processes. For example, the output processing section 140 performs a process (i.e., output process) that writes information into the storage section 170, and a process (i.e., transmission process) (i.e., output process) that transmits information through the communication section 196. For example, the output processing section 140 performs a process that writes information designated by a write instruction into the storage section 170, and a process (i.e., transmission process) that transmits information to an external device (e.g., server or another game device) that is provided outside the game device through a network. The transmission process includes a process that instructs the communication section 196 to transmit information, a process that instructs the communication section 196 with regard to the transmission target information, and the like.

As illustrated in FIG. 1, the game device according to one embodiment of the invention includes the input processing section 102, the game processing section 111, and the game result calculation section 118. The input processing section 102 acquires line-of-sight information about the player who wears the HMD (head-mounted display) 200, and input information that has been input by the player. For example, the input processing section 102 acquires the line-of-sight information about the player that has been detected by a tracking process. For example, when position information and direction information about the HMD 200 have been detected by the tracking process, the input processing section 102 acquires the line-of-sight information (line-of-sight direction information) and viewpoint position information about the player that are determined by the position information and the direction information about the HMD 200. The input processing section 102 also acquires the input information that has been input by the player using the input device 160. For example, the input processing section 102 acquires performance information (i.e., input information) about the player that has been input using the performance information input device 161.

In one embodiment of the invention, when the game includes a first game and a second game, the game processing section 111 performs a first game process based on the acquired input information, and performs a second game process based on the acquired line-of-sight information, the first game process being a process for the player to play the first game, and the second game process being a process for the player to play the second game. The first game and the second game implement the game that is executed while acquiring the line-of-sight information about the player and the input information. The first game and the second game can be executed parallel to each other, for example. Specifically, the first game that is implemented by the first game process, and the second game that is implemented by the second game process, may be games that are implemented independently of each other, for example.

The game result calculation section 118 calculates the game result achieved by the player based on the result of the first game process and the result of the second game process. For example, the game result calculation section 118 calculates the overall game result achieved by the game play performed by the player. For example, the game result calculation section 118 calculates the final game result achieved by the player based on the result of the first game process and the result of the second game process.

When the game is a music game, the input information that is input using the input device 160 is performance information. The input information may include operation information about the game that has been input by the player. For example, when the input device 160 functions as a game controller (see above), the input information includes operation information about the game that has been input when the player has operated the game controller. The first game process is performed based on the operation information. When the game is a music game, the first game process may be performed based on the operation information and the performance information.

The line-of-sight information is information that represents the line-of-sight direction of the player. The line-of-sight information is acquired by the tracking process described above, for example. The second game process may be a game process that is performed based on the line-of-sight information, and the operation information (see above) that is included in the input information. The second game process may be a game process that is performed based on the line-of-sight information (line-of-sight direction information) about the player, and viewpoint information that includes viewpoint position information.

The first game process and the second game process are performed based on a game program that is stored in the storage section 170 or the information storage medium 180. For example, the first game process is performed based on the input information that has been input using the input device 160, and the game program. More specifically, the first game process is performed based on the performance information and the game program, or performed based on the performance information, the operation information, and the game program. The second game process is performed based on the line-of-sight information and the game program, for example. Alternatively, the second game process is performed based on the line-of-sight information, the operation information, and the game program.

The first game process performs a game process that allows the player to play the first game. Specifically, the first game process performs a process that proceeds with the game based on the input information (performance information, or performance information and operation information) that has been input using the input device 160. For example, the first game is a game that proceeds based on the input information (performance information, or performance information and operation information).

The second game process performs a game process that allows the player to play the second game. For example, the second game process performs a process that proceeds with the game based on the line-of-sight information (or the line-of-sight information and the operation information) about the player. For example, the second game is a game that proceeds based on the line-of-sight information (or the line-of-sight information and the operation information).

The result of the first game process is a result obtained by the game play performed by the player during the first game. For example, the result of the first game process is a rating result with respect to the game play performed by the player during the first game. The result of the first game process may be the game result (e.g., score or points) acquired by the player during the first game, for example.

The result of the second game process is a result obtained by the game play performed by the player during the second game. For example, the result of the second game process is a rating result with respect to the game play performed by the player during the second game. The result of the second game process may be the game result (e.g., score or points) acquired by the player during the second game, for example.

The game result calculated based on the result of the first game process and the result of the second game process is the overall game result (rating result) with respect to the player with regard to the first game and the second game, for example. The game result calculated based on the result of the first game process and the result of the second game process may be the final game result of the entire game including the first game and the second game. For example, the game result calculated based on the result of the first game process and the result of the second game process may be the overall game result of the game that is executed while acquiring the line-of-sight information about the player and the input information. The game result may be displayed to the player in the form of a score, points, and the like that have been acquired by the player. Alternatively, a bonus or the like that is determined based on the game result may be given to the player without displaying the game result to the player. For example, an encore of the audience, or a visual effect that praises the player for the game result, may be displayed (generated) based on the game result achieved by the player. In this case, the encore or the visual effect corresponds to the bonus or the like that is given to the player.

For example, the first game that is implemented by the first game process is a timing input game in which the game process is performed based on the input information (e.g., performance information). The timing input game may be a music game in which the game process is performed based on the performance information about the player that has been input using the performance information input device 161, for example. The music game is an example of the timing input game. Note that the first game may be a karaoke game.

The timing input game is a game in which the player performs a given operation input at a given timing, and the input timing is compared with a reference timing to rate the operation input performed by the player. The music game is a game in which the player performs a given operation input at a timing according to a musical composition, and the input timing is compared with a reference timing to rate the operation input performed by the player. For example, the music game is a game in which the players compete for the performance skill with respect to rhythm, pitch, and the like. The music game may be a game in which the player sings, or may be a game in which the player plays a musical instrument. When the game is a music game in which the player sings, parts other than the vocal part that is sung by the player are reproduced based on the musical composition information read from the musical composition information storage section 174. When the game is a music game in which the player plays a musical instrument, parts other than the musical instrument part that is played by the player are reproduced based on the musical composition information read from the musical composition information storage section 174. The game sound based on the musical composition is output from the sound output section 192 (e.g., headphone 270).

The second game that is implemented by the second game process is a game in which the game process is performed based on line-of-sight relationship information that represents the relationship between the line of sight of the player and the target. For example, the second game is a game in which the player basically turns the line of sight to the target.

More specifically, the second game is a game in which the game process is performed based on the line-of-sight relationship information that represents the relationship between the line of sight of the player and a spectator (i.e., target). For example, the second game is a game in which the player basically turns the line of sight to a spectator (i.e., target).

The target is a target object with respect to the line of sight of the player (i.e., the gazing target of the player). For example, the target is a display object that appears in the game (i.e., an object that is placed in the object space). For example, the target is a character. The character is a game play element that appears in the game. For example, the character represents a human, an animal, a robot, a moving object, or the like in the real world. The character is displayed within the game image as an object. Examples of the character include an audience character that appears in a music game. Note that the audience is not limited to an audience that appears in a music game. It suffices that the audience be an audience who cheers the game play performed by the player, for example. For example, the audience may be an audience that appears in a comic dialogue game or a theater game, an audience who cheers a battle game between players, or the like.

The line-of-sight relationship information is information that represents the relationship between the line of sight of the player and the target. For example, the line-of-sight relationship information is information that represents the relative relationship between the line of sight of the player and the target. For example, the line-of-sight relationship information is information that represents the direction of the line of sight of the player with respect to the position (representative position) of the target. When the target is a character, the line-of-sight relationship information is information that represents the direction of the line of sight of the player with respect to the position (representative position) or each part of the character.

Line-of-sight correlation information that represents the correlation between the line of sight of the player and the line of sight of the character (i.e., target) may be used as the line-of-sight relationship information. Examples of the line-of-sight correlation state include a first line-of-sight correlation state in which the line of sight of the player does not intersect the character, and the line of sight of the character does not intersect the player, a second line-of-sight correlation state in which the line of sight of the player intersects the character, and the line of sight of the character does not intersect the player, a third line-of-sight correlation state in which the line of sight of the character intersects the player, and the line of sight of the player does not intersect the character, a fourth line-of-sight correlation state in which the line of sight of the player intersects the character, and the line of sight of the character intersects the player, and the like. The game processing section 111 may perform the second game process while determining the line-of-sight correlation state.

Note that the game processing section 111 performs a process on a game that is played by the player in a virtual game space in which a plurality of objects are placed. For example, a plurality of objects (e.g., characters) are placed in the game space (virtual three-dimensional space) (i.e., object space), and the game processing section 111 performs various game processes (e.g., process that proceeds with the game, character process, object space setting process, or virtual camera control process) for implementing the game in the game space. The display processing section 120 performs a process that displays a game image viewed from a given viewpoint (e.g., the first viewpoint that corresponds to the left eye, and the second viewpoint that corresponds to the right eye) in the game space on the display section 220 (e.g., first display and second display) included in the HMD 200. Specifically, the display processing section 120 performs a process that displays a game image viewed from the viewpoint (virtual camera) of the player in the object space (i.e., game space). In this case, the viewpoint of the player is set using the viewpoint position information and the line-of-sight information (line-of-sight direction information) about the player.

The game processing section 111 performs a first rating process that rates the game play performed by the player during the first game, and a second rating process that rates the game play performed by the player during the second game. For example, the first rating process determines (rates) whether or not the player has skillfully performed the game play during the first game. The second rating process determines (rates) whether or not the player has skillfully performed the game play during the second game. The game result calculation section 118 calculates the game result achieved by the player based on the result of the first rating process and the result of the second rating process. For example, the game result calculation section 118 calculates the overall game result achieved by the game play performed by the player. For example, the game result calculation section 118 calculates the final game result achieved by the player.

When the first game is a music game, the first rating process is a rating process with respect to the performance of the player during the music game. Specifically, the first rating process is a process that rates the accuracy and the skill of the performance of the player. For example, reference performance information that represents a performance example (vocal performance example or musical instrument performance example) is stored in the musical composition information storage section 174. The first rating process that is a rating process with respect to the music game (i.e., first game) is implemented by performing a comparison process that compares the performance information that represents the performance (vocal performance or musical instrument performance) of the player (i.e., the performance information that is input using the performance information input device 161) with the reference performance information, for example. For example, the pitch, the rhythm, the inflection, and the like of the vocal performance of the player are rated by performing the comparison process that compares the performance information (performance data) with the reference performance information (reference performance data).

The second rating process with respect to the second game is a rating process that is performed based on the line-of-sight information about the player. For example, the second rating process is performed based on the line-of-sight relationship information that represents the relationship between the line of sight of the player and the target.

For example, the player gazes at the target when the line of sight of the player intersects the target. The second rating process is performed based on gaze time information that represents the time for which the player gazes at the target. Alternatively, the second rating process is performed based on gaze distance information that represents the distance between the player and the target when the player gazes at the target. The second rating process may be performed based on the timing at which the player gazes at the target. Alternatively, the second rating process may be performed based on a target among a plurality of targets at which the player has gazed (i.e., a target among a plurality of targets that the line of sight of the player has intersected). Specifically, the second rating process is performed based on the type of target at which the player gazes, for example.

The second rating process may be performed based on the line-of-sight information and the operation information about the player. Alternatively, the second rating process may be performed based on the line-of-sight information and the viewpoint information (that includes the viewpoint position information) about the player, or may be performed based on the viewpoint information and the operation information about the player.

The game processing section 111 performs the second rating process that rates the game play performed by the player during the second game based on the line-of-sight relationship information that represents the relationship between the line of sight of the player and the target, and the input state of the input information by the player during the first game. For example, the second rating process determines (rates) whether or not the input information has been input during the first game in a gaze state in which the line of sight of the player intersects the target. For example, when the game is a music game, the second rating process determines (rates) whether or not the performance information (i.e., input information) has been input by the player in the gaze state in which the player gazes at the target. Specifically, the second rating process determines (rates) whether or not the player has played a performance (vocal performance or musical instrument performance) in the gaze state in which the player gazes at the target. The second rating process may rate the game play performed by the player based on the input information (input value) in the gaze state. For example, the second rating process performs the comparison process that compares the performance information (performance data) about the player with the reference performance information (reference performance data) in the gaze state in which the player gazes at the target, and rates the game play performed by the player based on the comparison result. For example, the second rating process is performed so that the performance of the player is highly rated in the gaze state as compared with a state other than the gaze state.

The game processing section 111 may perform the second rating process that rates the game play performed by the player during the second game based on the line-of-sight relationship information that represents the relationship between the line of sight of the player and the target, and motion information about the player.

The motion information about the player can be acquired by detecting the motion of the input device 160 (i.e., at least one of the input devices 160-1 and 160-2 (hereinafter the same)) illustrated in FIG. 2A, for example. The input device 160 is provided with a light-receiving device (as described later), and the light-receiving device receives light emitted from a light-emitting device that is provided outside the input device 160. The motion of the input device 160 can be detected based on the received light. This makes it possible to acquire the motion information about the hand (part in a broad sense) of the player, for example. Alternatively, a motion sensor may be provided to the input device 160, and the motion of the input device 160 may be detected based on the detection result of the motion sensor to acquire the motion information about the player. Alternatively, a motion sensor may be provided to the HMD 200, and the motion of the HMD 200 may be detected based on the detection result of the motion sensor to acquire the motion information (e.g., the motion information that represents the motion of the head) about the player.

The second rating process rates the game play performed by the player during the second game based on the motion information about the player acquired as described above, and the line-of-sight relationship information that represents the relationship between the line of sight of the player and the target. For example, the motion information about the player is detected in the gaze state in which the line of sight of the player intersects the target, and the game play performed by the player is rated. For example, the game play performed by the player is highly rated when the motion of the player has been detected in the gaze state. For example, the rating value with respect to the game play performed by the player is increased when the motion amount of the player in the gaze state is equal to or larger than a given motion amount.

The game processing section 111 performs a process that changes the value of a parameter that is set to the target with respect to the line of sight of the player (i.e., the target to which the line of sight of the player is to be turned) based on the result of the game play performed by the player during the second game. The game processing section 111 calculates the result of the second rating process based on at least one of the value of the parameter and the number of targets for which the parameter has reached a given value.

The parameter is a game parameter that is used for the game process. For example, the parameter is set to the target as information that represents the state of the target (e.g., character (audience)). For example, information about the parameter is stored in the parameter storage section 176 illustrated in FIG. 1 so as to be linked to each target. The game processing section 111 (parameter processing section 115) performs a parameter process that changes the value of the parameter based on the result of the game play performed by the player during the second game. The game processing section 111 calculates the rating result (i.e., the result of the second rating process) (i.e., the rating result for the game play performed by the player) based on the value of the parameter that is changed as described above. For example, the game processing section 111 more highly rates the game play performed by the player during the second game as the value of the parameter increases. Alternatively, the game processing section 111 performs a determination process that determines whether or not the value of the parameter has changed and reached a given value set in advance (i.e., preset value (e.g., the maximum value of the parameter)) based on the result of the game play performed by the player. The game processing section 111 performs the determination process on a plurality of targets, and calculates the result of the second rating process based on the number of targets for which the value of the parameter has reached a given value (preset value or maximum value). For example, the game processing section 111 more highly rates the game play performed by the player during the second game as the number of targets for which the value of the parameter has reached the given value increases.

The game processing section 111 performs the first rating process that rates the game play performed by the player during the first game based on at least one of the pitch and the rhythm that are determined based on the performance information (i.e., input information) about the player. When the game is a music game, the game processing section 111 reads the reference performance information about the musical composition selected during the game play from the musical composition information storage section 174. The game processing section 111 performs the comparison process that compares the performance information (performance data) about the player with the reference performance information (reference performance data) to rate at least one of the pitch and the rhythm that are determined based on the performance information about the player, and rates the game play performed by the player during the first game. For example, the game processing section 111 rates the accuracy of the pitch or the rhythm of the performance of the player by calculating the degree of coincidence between the pitch or the rhythm of the performance of the player and the pitch or the rhythm of the reference performance.

The game processing section 111 performs a process that changes the value of a parameter that is set to the target with respect to the line of sight of the player based on the result of the game play performed by the player during the second game. The parameter is a game parameter that is used for the game process, and is set to the target as information that represents the state of the target (e.g., character (audience)) (see above). For example, the parameter is an enthusiasm level parameter (excitement level parameter) of a spectator described in detail later. The game processing section 111 performs a process that increases the value of the parameter as the result of the game play performed by the player during the second game is more highly rated, for example. For example, the game process is performed during the second game based on the line-of-sight information about the player. More specifically, the game process is performed based on the line-of-sight relationship information that represents the line-of-sight relationship between the line of sight of the player and the target. In this case, the game play performed by the player during the second game is rated by determining the gaze state in which the line of sight of the player intersects the target. For example, the value of the parameter is changed based on the length of the gaze time. For example, the value of the parameter is increased as the gaze time increases. Alternatively, the value of the parameter is changed based on the gaze distance or the gaze timing.

The game processing section 111 performs a process that changes at least one of the value of the parameter, the change rate of the parameter, the maximum value of the parameter, and the selection condition for the target based on the result of the game play performed by the player during the first game. For example, the value of the parameter is changed based on the result of the game play performed by the player during the second game while reflecting the result of the game play performed by the player during the first game. For example, the game processing section 111 performs a process that increases or decreases the value of the parameter, or increases or decreases the change rate of the parameter, or increases or decreases the maximum value of the parameter based on the result of the game play performed by the player during the first game. For example, the game processing section 111 increases the value of the parameter, or increases the change rate of the parameter, or increases the maximum value (preset value) of the parameter as the game play performed by the player during the first game is more highly rated.

The game processing section 111 changes the selection condition for the target during the second game based on the result of the game play performed by the player during the first game. For example, the game processing section 111 changes the target to be selected based on the result of the game play performed by the player during the first game. For example, the game processing section 111 increases the number of targets to be selected as the game play performed by the player during the first game is more highly rated. Alternatively, the game processing section 111 changes the target to be selected corresponding to the level of rating on the game play performed by the player during the first game. For example, the game processing section 111 performs a process that sets a target that is not selected when the game play performed by the player during the first game is lowly rated, to be the selection target, when the game play performed by the player during the first game is highly rated.

Note that the change rate of the parameter and the maximum value of the parameter are stored in the parameter storage section 176 so as to be linked to each parameter. For example, the value of the parameter, the change rate of the parameter, the maximum value of the parameter, and the selection condition for the target are stored in the parameter storage section 176 so as to be linked to each of a plurality of targets.

When a process that selects the target has been performed during the second game, the game processing section 111 performs a process that changes at least one of the value of the parameter, the change rate of the parameter, and the maximum value of the parameter based on the result of the game play performed by the player during the first game after the target has been selected.

More specifically, the target with respect to the line of sight of the player is selected during the second game. For example, the target is selected when the player has gazed at the target in a state in which the line of sight of the player intersects the target. In this case, the target with respect to the line of sight of the player is selected on condition that the gaze time or the gaze distance has satisfied a given condition. For example, the target with respect to the line of sight of the player is selected on condition that the gaze time is longer than a given time, or the gaze distance is shorter than a given distance. The game play performed by the player during the first game is rated after the target has been selected as described above, and the value of the parameter, the change rate of the parameter, or the maximum value of the parameter is changed.

The game processing section 111 performs a process that changes at least one of the value of the parameter, the change rate of the parameter, and the maximum value of the parameter based on at least one of the gaze time information that represents the time for which the player gazes at the target, the gaze distance information that represents the distance between the player and the target when the player gazes at the target, and selection timing information about the target.

For example, the game processing section 111 performs a process that changes at least one of the value of the parameter, the change rate of the parameter, and the maximum value of the parameter based on the gaze information that includes the gaze time information, the gaze distance information, or the like. The gaze information is information that includes at least one of the gaze time information, the gaze distance information, gaze/no-gaze information that represents whether or not the player gazes at the target, and gaze target part information that represents a part of the character (i.e., target) at which the player gazes. It is possible to reflect the gaze state of the player in the value of the parameter, the change rate of the parameter, or the maximum value of the parameter by changing the value of the parameter, the change rate of the parameter, or the maximum value of the parameter using the gaze information.

The game processing section 111 changes the value of the parameter, the change rate of the parameter, or the maximum value of the parameter based on the selection timing information about the target. For example, the game processing section 111 changes the value of the parameter, the change rate of the parameter, or the maximum value of the parameter corresponding to the target selection timing, or whether or not the target selection timing has coincided with a given reference timing.

An affinity parameter (affinity information) is set between the musical composition (e.g., the musical composition itself, or the genre of the musical composition) that is used during the first game, or the input state of the input information during the first game, and the target with respect to the line of sight of the player (i.e., the affinity parameter represents the affinity between the musical composition that is used during the first game, or the input state of the input information during the first game, and the target). For example, the affinity parameter between the musical composition and the target may be stored so as to be linked to the musical composition information stored in the musical composition information storage section 174 illustrated in FIG. 1.

The game processing section 111 performs a process that changes at least one of the value of the parameter, the change rate of the parameter, the maximum value of the parameter, and the selection condition for the target based on the affinity parameter. For example, the game processing section 111 changes the value of the parameter, the change rate of the parameter, or the maximum value of the parameter in favor of the player as the degree of affinity represented by the affinity parameter increases. For example, the game processing section 111 increases the value of the parameter or the change rate of the parameter, or decreases the maximum value of the parameter, as the degree of affinity increases.

The affinity parameter is also set between the input state of the input information during the first game, and the target with respect to the line of sight of the player. For example, the affinity parameter is set between the input tempo or the input timing pattern of the input information and the target. A target that increases the affinity parameter when the input tempo is high, and a target that increases the affinity parameter when the input tempo is low, are provided. Alternatively, the affinity parameter of the target may be set based on the degree of coincidence between the input timing pattern of the player and a reference input timing pattern that is set to the target. For example, the affinity parameter of the target is increased when the degree of coincidence between the input timing pattern of the player and the reference input timing pattern increases. The game processing section 111 changes the value of the parameter, the change rate of the parameter, or the maximum value of the parameter based on the affinity parameter that has been set as described above.

The display processing section 120 may perform a display process that displays the affinity parameter in an identifiable manner. For example, the display processing section 120 performs a display process that that allows the player to visually determine the affinity between the musical composition or the input state, and the target. For example, the display processing section 120 changes the color, the texture, the shape, the effect, and the like of the target so that the player can determine the affinity parameter. The effect is an effect display object that is displayed so as to be added to the object that forms the target, a visual effect, and the like.

The game processing section 111 performs a process that, when the player has played one of the first game and the second game in a state in which a failure determination has not been made, and then started playing the other of the first game and the second game, increases at least one of the value of the parameter and the change rate of the parameter in the other of the first game and the second game.

For example, when the player has played the first game (i.e., one of the first game and the second game) in a state in which only a success determination has been made (i.e., a failure determination is not made), and then started playing the second game (i.e., the other of the first game and the second game), the value of the parameter or the change rate of the parameter in the second game is increased. For example, the value of the parameter or the change rate of the parameter is significantly increased as compared with a normal state. Likewise, when the player has played the second game (i.e., one of the first game and the second game) in a state in which only a success determination has been made (i.e., a failure determination is not made), and then started playing the first game (i.e., the other of the first game and the second game), the value of the parameter or the change rate of the parameter in the first game is significantly increased.

2. Method

The method according to one embodiment of the invention is described in detail below. An example in which the method according to one embodiment of the invention is applied to a music game (e.g., live performance game or karaoke game) in which the player sings is mainly described below. Note that the game to which the method according to one embodiment of the invention is applied, is not limited thereto. For example, the method according to one embodiment of the invention may be applied to a music game in which the player plays a musical instrument such as a stringed instrument (e.g., guitar), a percussion instrument (e.g., drum), or a keyboard instrument (keyboard or piano) (i.e., a game that allows the players to compete for a rhythm or performance skill). The method according to one embodiment of the invention may also be applied to various other games such as a communication game (human relationship simulation game) that allows the player to communicate with an opposite-sex character or the like, a battle game, an RPG game, a robot game, a card game, a sport game, and an action game.

2.1 HMD

Figure 2A:
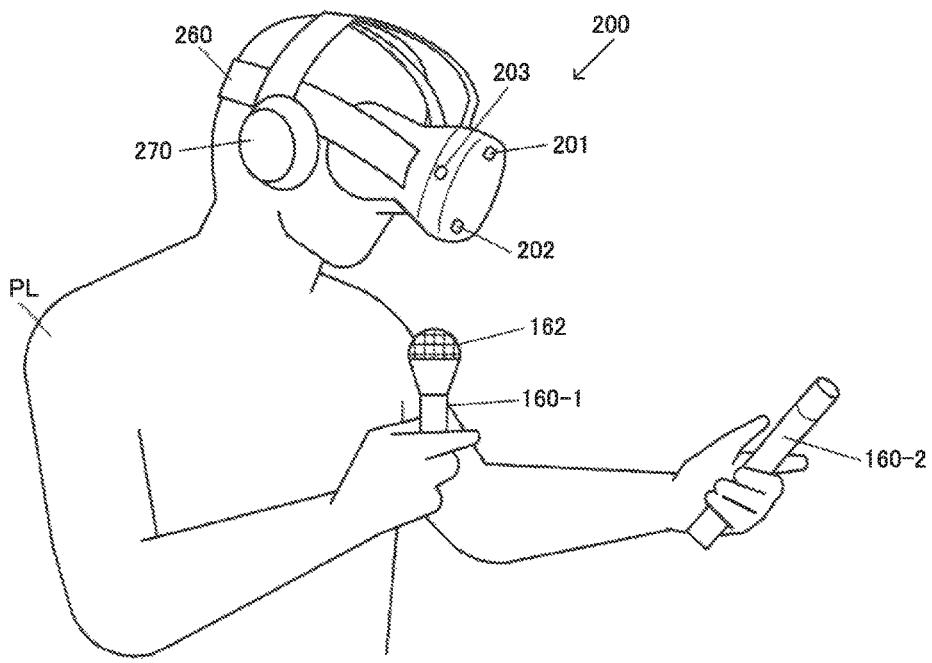
FIGS. 2A and 2B illustrate an example of an HMD that is used in connection with one embodiment of the invention.

FIG. 2A illustrates an example of the HMD 200 that is used for the game device according to one embodiment of the invention. As illustrated in FIG. 2A, the HMD 200 includes a plurality of light-receiving devices (photodiodes) 201, 202, and 203. The light-receiving devices 201 and 202 are provided to the front side of the HMD 200, and the light-receiving device 203 is provided to the right side of the HMD 200. Light-receiving devices not illustrated in FIG. 2A are also provided to the left side, the upper side, and the like of the HMD 200.

A player PL holds an input device 160-1 with the right hand, and holds an input device 160-2 with the left hand. A plurality of light-receiving devices (not illustrated in FIG. 2A) are provided to the input devices 160-1 and 160-2. The microphone 162 (sound input device) is provided to the input device 160-1, and the player PL sings into the microphone 162 during the music game. The input devices 160-1 and 160-2 also function as a game controller, and are provided with an operation button, a direction key, and the like (not illustrated in FIG. 2A). Note that the player may hold only one input device 160 during the game.

A head band 260 and the like are provided to the HMD 200 so that the player PL can wear the HMD 200 on the head in a comfortable and stable manner. A headphone terminal (not illustrated in FIG. 2A) is also provided to the HMD 200. When a headphone 270 (sound output section 192) is connected to the headphone terminal, the player PL can listen to a game sound generated by the three-dimensional audio process, for example. The player PL inputs operation information by operating the input devices 160-1 and 160-2 (that function as a game controller), and making a nod motion and a head shake motion to enjoy game play. A nod motion and a head shake motion can be detected by the sensor section 210 included in the HMD 200, for example.

Figure 2B:
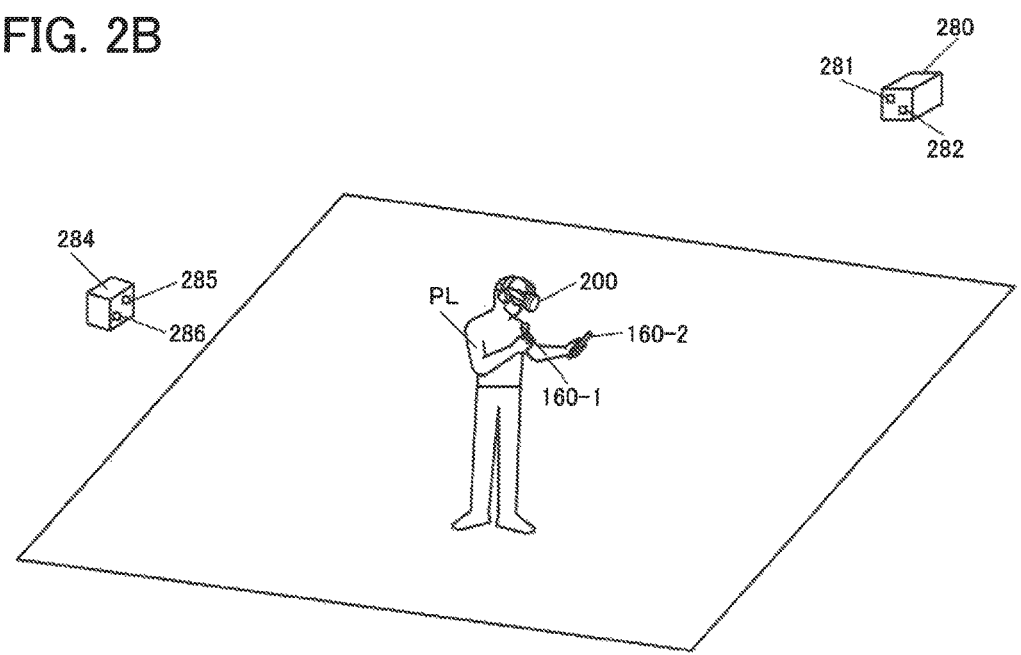

As illustrated in FIG. 2B, base stations 280 and 284 are provided in a play area of the player PL. Light-emitting devices 281 and 282 are provided to the base station 280, and light-emitting device 285 and 286 are provided to the base station 284. The light-emitting devices 281, 282, 285, and 286 are implemented by an LED that emits laser light (e.g., infrared laser light), for example. The base stations 280 and 284 radially emit laser light using the light-emitting devices 281, 282, 285, and 286, for example. The light-receiving devices 201 to 203 and the like provided to the HMD 200 illustrated in FIG. 2A receive laser light emitted from the base stations 280 and 284 so that the HMD 200 can be tracked, and the position and the direction of the head of the player PL can be detected. The light-receiving devices (not illustrated in the drawings) provided to the input devices 160-1 and 160-2 receive laser light emitted from the base stations 280 and 284 so that the input devices 160-1 and 160-2 can be tracked, and the position and the direction of the input devices 160-1 and 160-2 can be detected. This makes it possible to display an image of a microphone that corresponds to the input device 160-1 within the game image, for example.

Figure 3A:
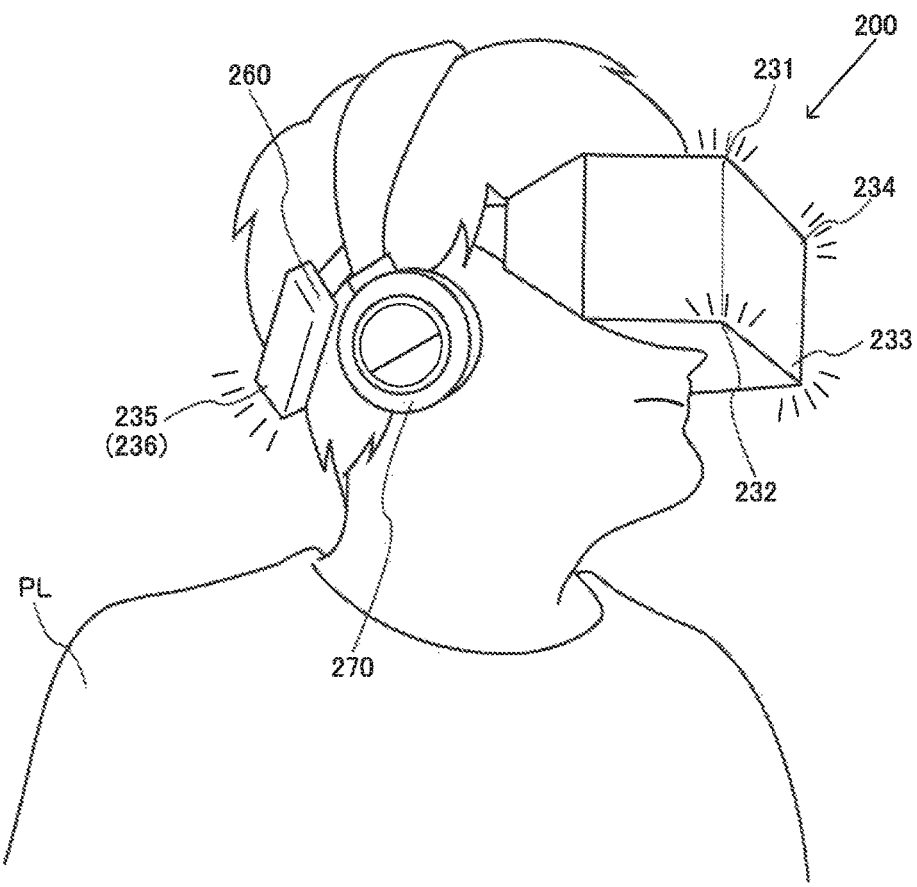
FIGS. 3A and 3B illustrate another example of an HMD that is used in connection with one embodiment of the invention.
Figure 3B:
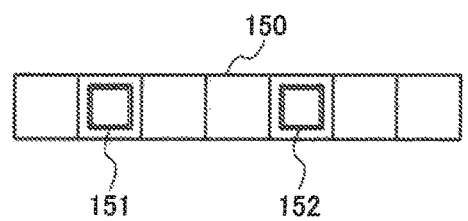

FIG. 3A illustrates another example of the HMD 200. In the example illustrated in FIG. 3A, a plurality of light-emitting devices 231 to 236 are provided to the HMD 200. The light-emitting devices 231 to 236 are implemented by an LED or the like. The light-emitting devices 231 to 234 are provided to the front side of the HMD 200, and the light-emitting devices 235 and 236 (not illustrated in FIG. 3A) are provided to the back side of the HMD 200. The light-emitting devices 231 to 236 emit (generate) light in the visible region, for example. More specifically, the light-emitting devices 231 to 236 respectively emit lights that differ in color. An imaging section 150 illustrated in FIG. 3B is placed in front of the player PL, and light emitted from each of the light-emitting devices 231 to 236 is captured by the imaging section 150. Specifically, a spotlight emitted from each of the light-emitting devices 231 to 236 is included in the image (captured image) captured by the imaging section 150. The head (HMD) of the player PL is tracked by performing image processing on the captured image. Specifically, the three-dimensional position, the three-dimensional motion, and the like of the head of the player PL are detected.

As illustrated in FIG. 3B, a first camera 151 and a second camera 152 are provided to the imaging section 150, for example. The position of the head of the player PL in the depth direction can be detected by utilizing a first captured image obtained (captured) by the first camera 151 and a second captured image obtained (captured) by the second camera 152, for example. The rotation angle (line of sight) of the head of the player PL can be detected based on motion detection information output from a motion sensor that is provided to the HMD 200. An image of the virtual three-dimensional space (i.e., an image viewed from the virtual camera that corresponds to the viewpoint of the player) can be displayed on the display section 220 included in the HMD 200 by utilizing the HMD 200 described above, irrespective of the direction (within a 360-degree range) in which the player PL faces. Note that an LED that emits infrared light may be used as the light-emitting devices 231 to 236 instead of an LED that emits visible light. The position, the motion, and the like of the head of the player may be detected using another method such as a method that utilizes a depth camera, for example.

Note that the method used to implement the tracking process that detects the viewpoint information (e.g., viewpoint position and line-of-sight direction), the position information, and the like about the player is not limited to the methods described above with reference to FIGS. 2A to 3B. For example, the tracking process may be implemented by the HMD 200 using a motion sensor or the like provided to the HMD 200. Specifically, the tracking process may be implemented without providing an external device such as the base stations 280 and 284 illustrated in FIG. 2B, and the imaging section 150 illustrated in FIG. 3B. Alternatively, the viewpoint information and the like about the player may be detected using various known viewpoint tracking methods (e.g., eye tracking, face tracking, or head tracking). For example, when an eye tracking method is used, the position, the shape, and the like of the left pupil and the right pupil of the player are recognized. The position of the left eye, the position of the right eye, the line-of-sight direction of the left eye, the line-of-sight direction of the right eye, and the like are determined (i.e., the viewpoint information about the player is acquired) to implement the viewpoint tracking process. The eye tracking process may be implemented by capturing the left eye and the right eye of the player using an imaging section, and performing an image recognition process (e.g., pupil image recognition process) on the captured image, for example. For example, when a face tracking method is used, the face of the player is captured using an imaging section, and a face image recognition process is performed. The position and the direction of the face of the player are determined based on the results of the image recognition process, and the viewpoint position and the line-of-sight direction of the player are calculated to implement the viewpoint tracking process.

2.2 Play Area and Game Device Housing

Figure 4B:
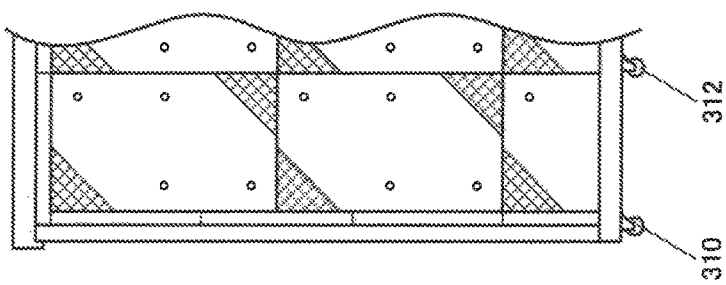
FIGS. 4A and 4B are views illustrating a play area.
Figure 4A:
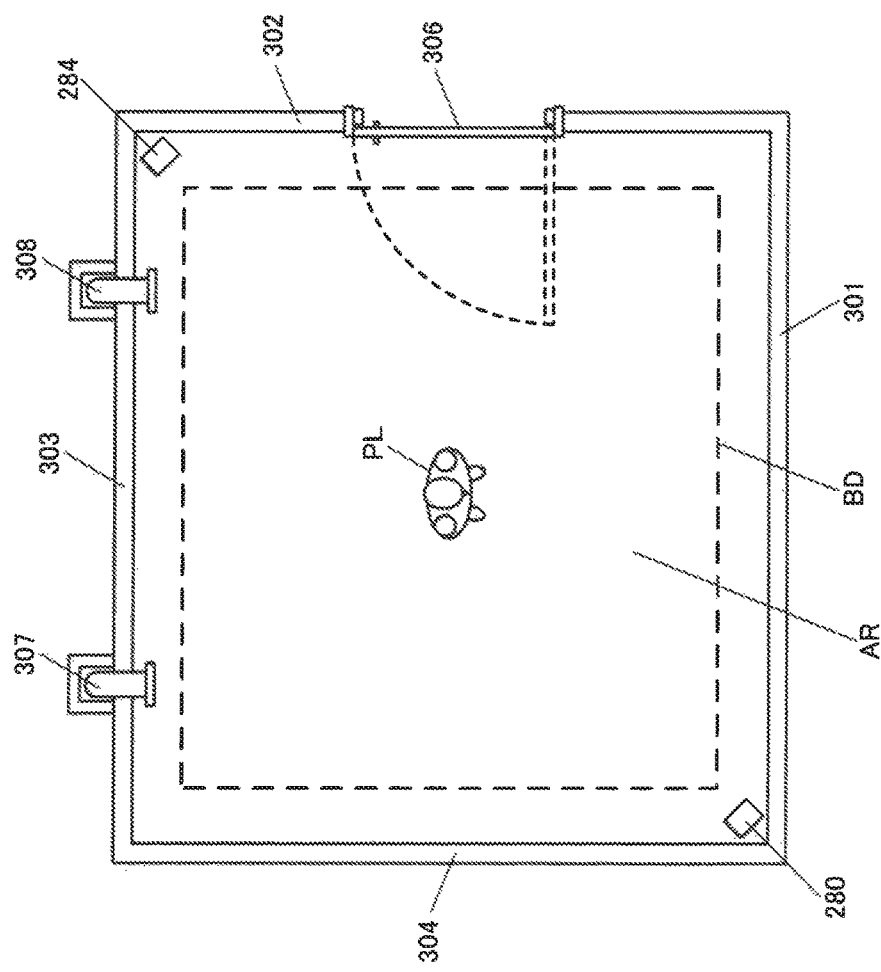

FIGS. 4A and 4B illustrate an example of the play area in which the game according to one embodiment of the invention is implemented. The play area is implemented by a box-like soundproof private room. As illustrated in FIG. 4A, the box-like private room has walls 301, 302, 303, and 304, a door 306, and ventilators 307 and 308. As illustrated in FIG. 4B, casters 310 and 312 are provided to the bottom of the box-like private room so that the box-like private room can be moved. The player PL opens the door 306, enters the private room, and plays the game. The space inside the private room is the play area (play space) for the player PL.

As illustrated in FIG. 4A, an area AR that is estimated to be the moving range of the player PL is set to the play area defined by the box-like private room. The viewpoint information (viewpoint position and line-of-sight direction), the position information, and the like about the player PL can be tracked within the area AR using the base stations 280 and 284 and the like. On the other hand, a reliable tracking process cannot be implemented at a position situated beyond the boundary BD of the area AR. The player PL may collide with the walls 301, 302, 303, and 304 (i.e., it is undesirable from the viewpoint of safety) if the player PL moves beyond the boundary BD of the area AR. The range of the area AR can be set by performing an initialization setting process on the game device, for example.

Figure 5:
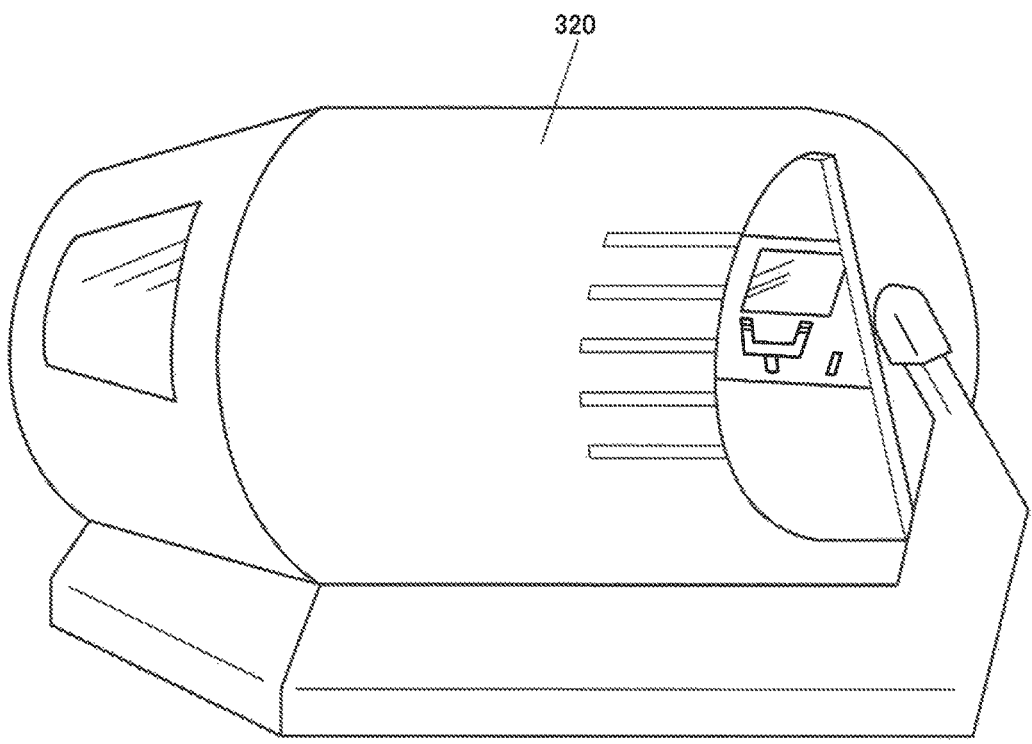
FIG. 5 is a view illustrating a game device housing.

FIG. 5 illustrates an example of a game device housing 320. In the example illustrated in FIG. 5, the game device includes a large game device housing 320, and the player can play the game inside the game device housing 320. Various devices (operation device), a tool, a seat (chair), and the like are provided inside the game device housing 320. The player enters the game device housing 320, wears the HMD 200 on the head, and enjoys the game in a virtual reality (VR) world.

2.3 Outline of Game

An outline of the game that is implemented by the method according to one embodiment of the invention is described below. The game that is implemented according to one embodiment of the invention is a music game in which the player enjoys a vocal performance as if he/she were a vocalist of a band that plays a live performance on the stage. The player can experience an unprecedented sense of exaltation by singing in front of a huge audience, and also experience great pleasure by being cheered wildly by his/her fans. The player can experience a situation in which the player sings live on the stage while being surrounded by his/her fans through the use of an HMD and high-power surround speakers.

The audience situated around the stage interactively give a cheer and make various actions in response to the player's vocal performance and actions on the stage. The player plays a live performance on the stage together with his/her band members in front of a full audience including fans situated in the front row whose face can be clearly seen from the stage.

The player makes a reservation for the entry time, and performs play settings in an entrance space provided within a shared space, and enjoys a live performance in the safe private room illustrated in FIGS. 4A and 4B in which a cushion material is provided.

The player selects a concert appearance mode when performing the play settings. The player then selects the desired musical composition and the desired stage. The player then wears and holds devices such as the HMD 200 and the input devices 160-1 and 160-2 described above with reference to FIGS. 2A and 2B, for example. The operator of the store makes a cautionary statement and the like, and assists the player to wear (hold) and adjust the devices. Calibration (initialization) of the private room space (i.e., play area) is performed by the operator in advance.

The input device 160-1 illustrated in FIG. 2A functions as a microphone and a game controller. The arms and the hands of the player (virtual player) are not drawn in the VR space. The position of the input device 160-1 or the like that is held by the player is sensed, and a microphone image is drawn at the same position, and makes a motion corresponding to the motion of the player.

The player performs a vocal key adjustment in a standby room within the VR space. The standby room is a standby space under the stage. The space in which the player stands within the VR space is formed by a large lift. The lift moves upward when the player starts a performance, and the player appears on the stage.

Cheers and shouts in the hall that have been heard from a long distance gradually increase in volume as the lift moves upward, and become powerful and vivid. When the player has appeared on the stage, a spotlight is directed on the player from the front side, and the player draws enthusiastic applause. A performance starts when the player has input a start action (e.g., hand action), and the player plays a live performance.

Figure 6:
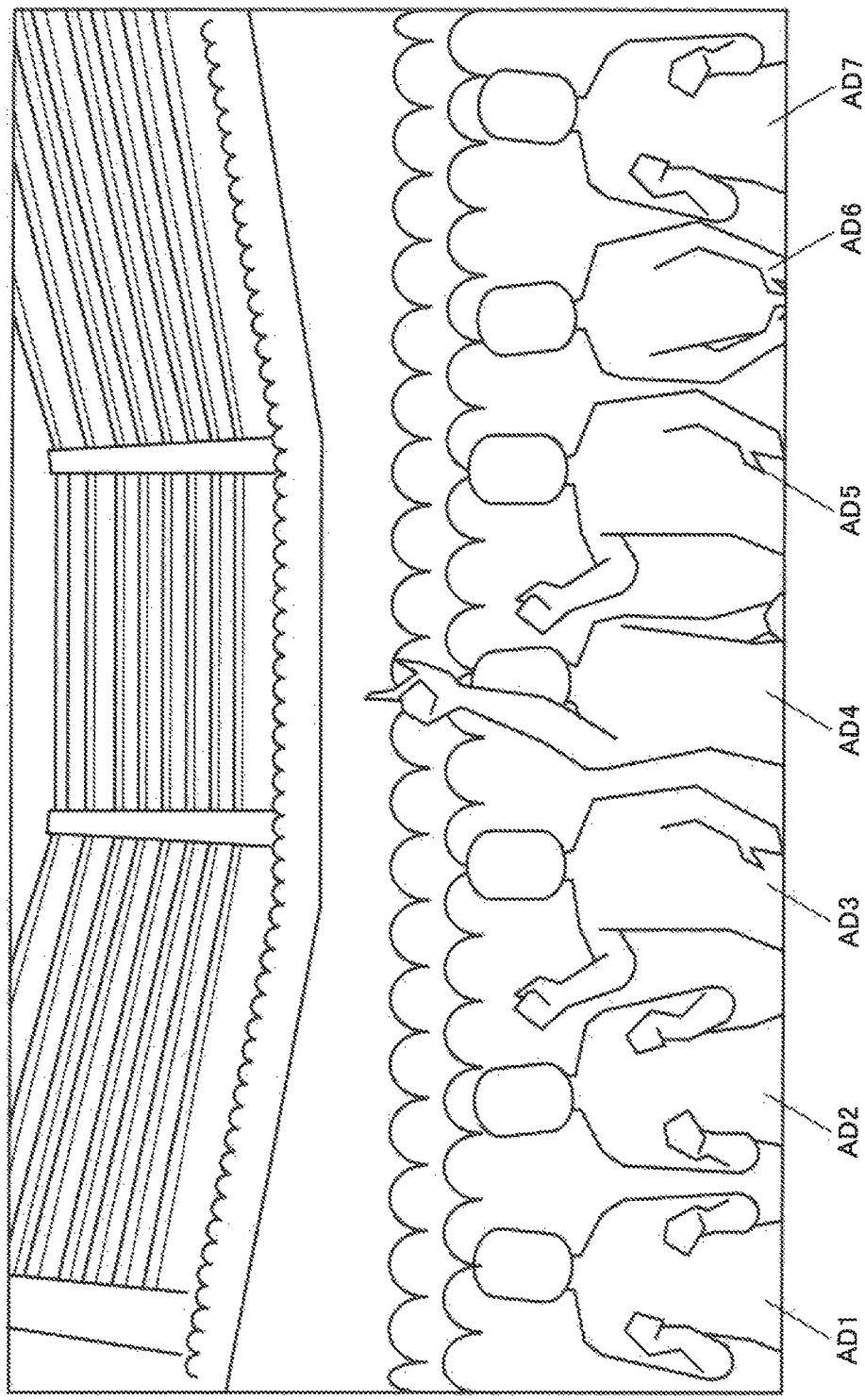
FIG. 6 illustrates an example of a game image that is generated according to one embodiment of the invention.
Figure 7:
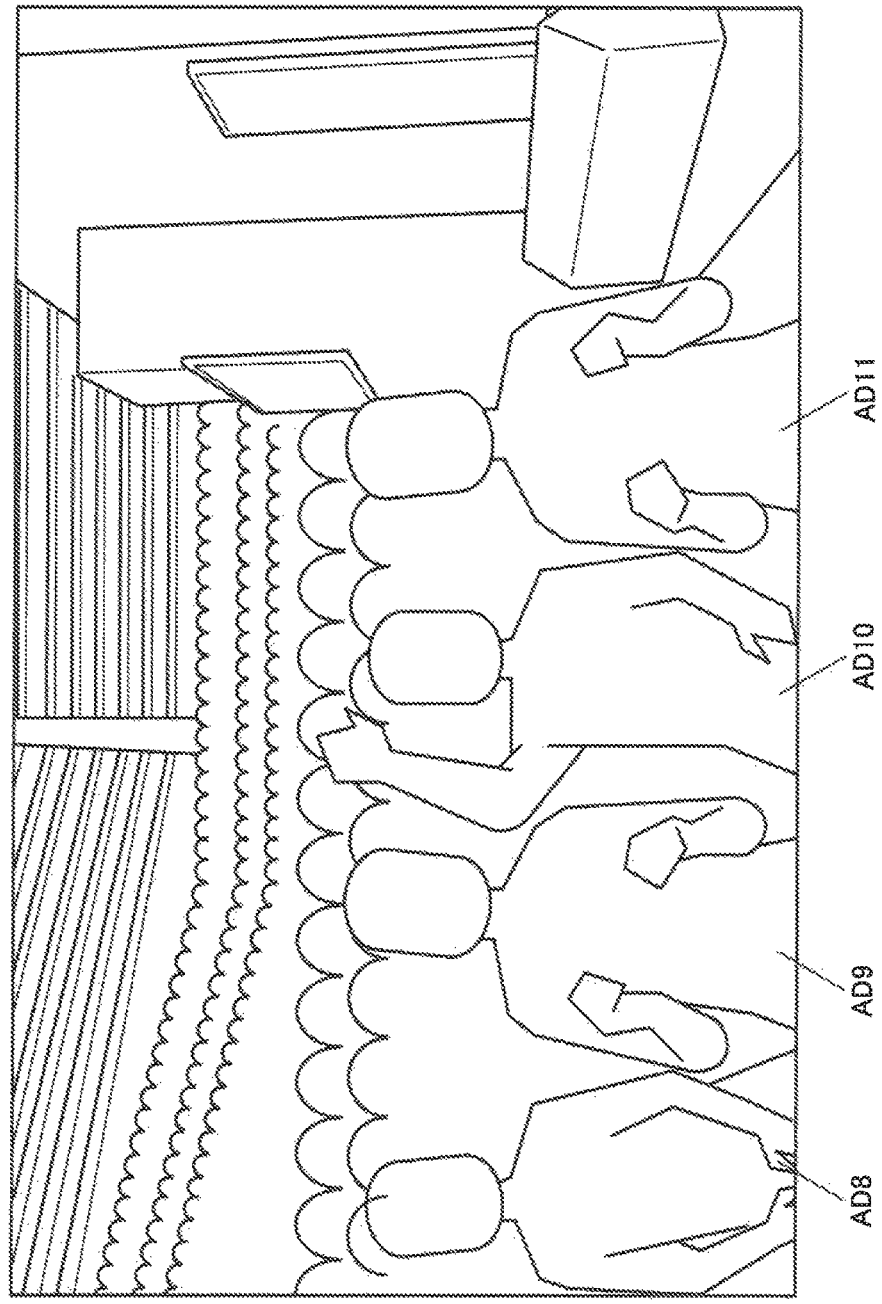
FIG. 7 illustrates an example of a game image that is generated according to one embodiment of the invention.
Figure 8:
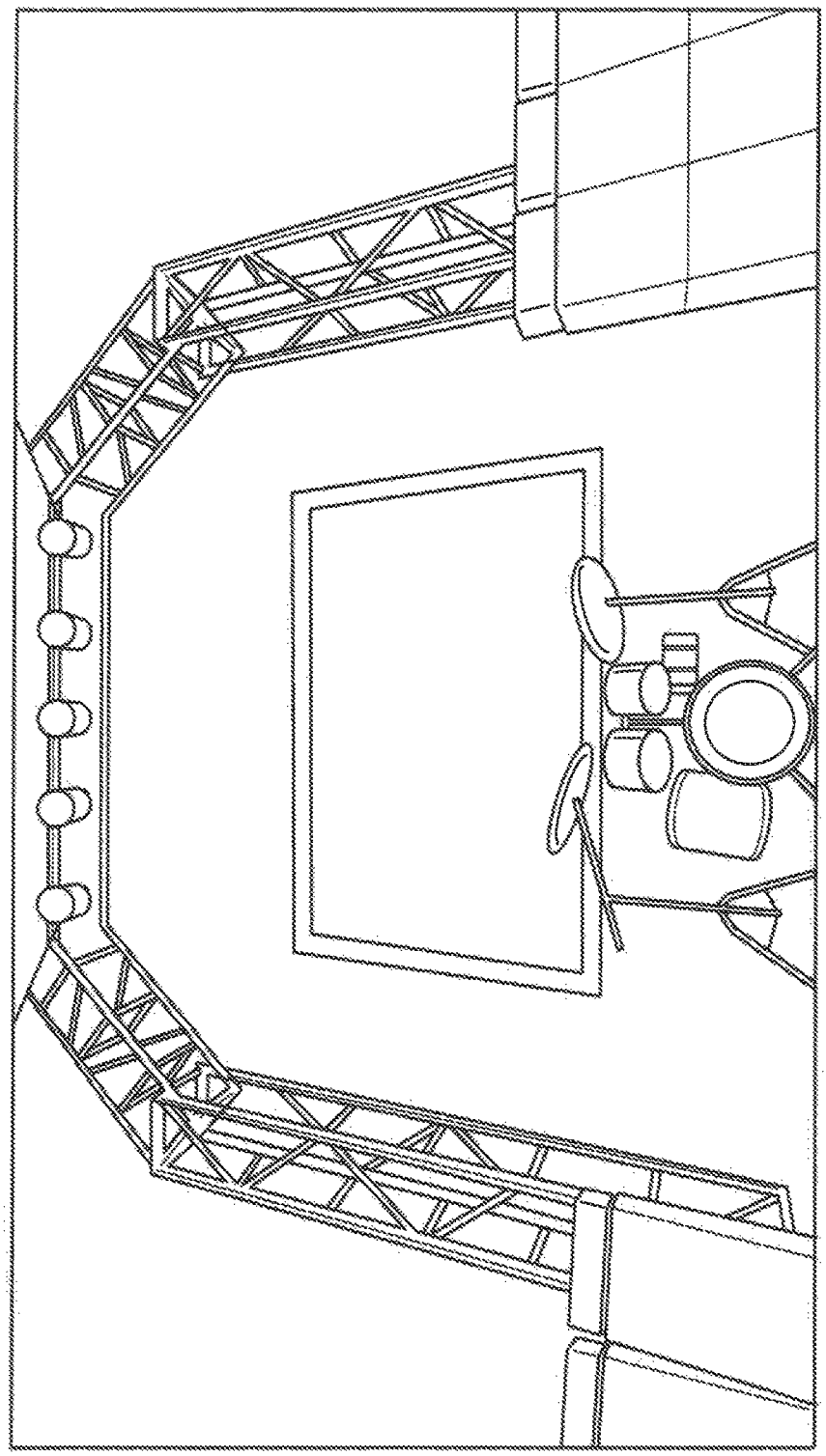
FIG. 8 illustrates an example of a game image that is generated according to one embodiment of the invention.
Figure 9:
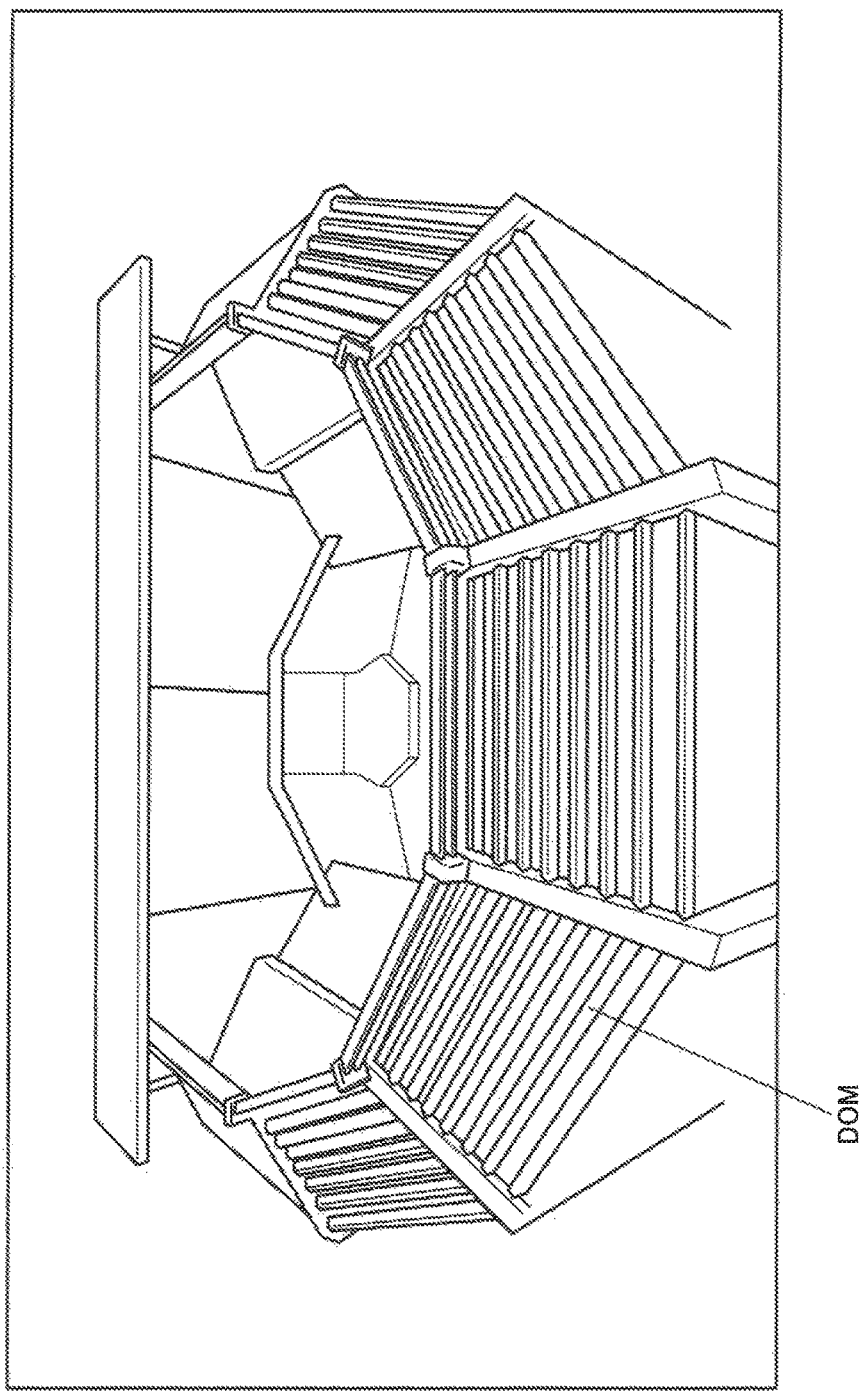
FIG. 9 is an overhead view illustrating a concert hall within a VR space.

The player enjoys singing enthusiastically on the stage during the live performance. FIGS. 6 to 8 illustrate an example of the game image (i.e., an image in the VR space) that is displayed on the HMD 200 worn on the player on the stage. As illustrated in FIGS. 6 and 7, a full audience is displayed in front of the player. FIG. 6 illustrates the game image when the player faces in the front direction, and FIG. 7 illustrates the game image when the player has turned to the right. As illustrated in FIG. 8, a game image that displays drums, amplifiers, a screen, and the like is displayed when the player has turned toward the back. As illustrated in FIG. 9, the player plays the live performance in a huge concert hall provided with a dome DOM similar to that in the real world. The concert hall within the VR space is full of a large audience, and applause from the audience becomes a climax during the vocal performance of the player. Note that the lyrics and the pitch are displayed on a monitor that is provided at the feet of the player within the VR space. The player enjoys the vocal performance while optionally watching the lyrics and the pitch displayed on the monitor.

As illustrated in FIGS. 6 to 8, the game device according to one embodiment of the invention that utilizes the HMD 200 displays the VR space (i.e., game space) around the player. For example, the game image illustrated in FIG. 6 is displayed on the HMD 200 when the player who wears the HMD 200 has faced forward, and the game image illustrated in FIG. 7 is displayed on the HMD 200 when the player has turned to the right. The game image illustrated in FIG. 8 is displayed on the HMD 200 when the player has turned toward the back. Therefore, it is possible to allow the player to experience virtual reality as if he/she were playing a vocal performance in a huge concert hall in which a large audience gives a cheer. This makes it possible to allow the player to be more fully involved in the game as compared with a known game device, for example.

In one embodiment of the invention, the motion (action) of the audience and a cheer from the audience change corresponding to the inflection of the music. The motion of the audience and a cheer from the audience also change in response to the action of the player. In the example illustrated in FIG. 6, spectators AD1 to AD7 in the audience who are situated near the stage where the player stands are rendered using a polygon model object that is formed by a number of polygons. In the example illustrated in FIG. 7, spectators AD8 to AD11 in the audience are rendered using a polygon model object. On the other hand, spectators in the audience who are situated away from the stage are rendered using an image that is drawn on a billboard polygon that the line of sight of the player perpendicularly intersects.

The motion of the spectators AD1 to AD11 that are rendered using a polygon model is implemented by a motion reproduction process using motion data, for example. The spectators AD1 to AD11 make a basic action (basic motion) according to the rhythm of the music. The action of the audience is classified into a plurality of levels for representing the degree of excitement during the music. The level basically changes depending on the inflection of the music. The level may increase when the performance of the player is highly rated.

The audience also interactively responds to the voice and the motion of the player. For example, when the player has performed an action (e.g., "sings in a specific direction" or "waves his/her hand"), the audience situated in that direction gents excited, and makes a basic action that is louder by one level, or performs a sudden excitement action regardless of the rhythm of the music.

The rating process that rates the game play performed by the player on the stage is classified into two rating processes. The first rating process rates the degree by which the performance of the player has livened up a specific audience. Specifically, the first rating process rates the degree by which the player has caused a specific audience to get wildly excited. The second rating process determines (rates) whether or not the player has sung successfully.

The rating system that utilizes the first rating process is the main rating system whereby feedback from the audience during the game play performed by the player can be obtained. This rating system aims at a spectator (i.e., target) in the audience who performs an action that appeals to the player. In the example illustrated in FIG. 6, the spectator AD4 performs an action that appeals to the player by raising the right hand, and is set to be the target. In the example illustrated in FIG. 7, the spectator AD10 that performs an action that appeals to the player is set to be the target. Note that a plurality of spectators in the audience may be set to be the target. In the example illustrated in FIG. 7, the spectators AD3, AD4, and AD5 may be set to be the target.

When the player has performed a first action or a second action described below aimed at a spectator in the audience who appeals to the player, the value of the enthusiasm level parameter (enthusiasm level gauge) of the spectator increases. When the enthusiasm level parameter has reached the maximum value, the spectator performs an enthusiastic action that represents great joy. The enthusiastic action is an action that represents great joy regardless of the rhythm of the music, for example.

The first action that is performed by the player with respect to a spectator who appeals to the player is to sing to the spectator (i.e., target) (i.e., sing while gazing at the spectator). The first action is rated during a singing part of a musical composition that includes a singing part and a bridge part.

The second action (motion) that is performed by the player with respect to a spectator who appeals to the player is to sing to raise his/her hand in time with a cheer from the spectator. Alternatively, the second action that is performed by the player with respect to a spectator who appeals to the player is to produce a sound in time with a cheer from the spectator.

A spectator that is subjected to the first action and the second action occurs randomly within a concert hall, for example. The player can select only a given number of targets during a performance of one tune. When the enthusiasm level parameter of each of the given number of spectators has reached the maximum value, it is determined that the player has cleared all of the given number of targets, and the player is rated to the maximum extent. For example, when the number of spectators that can be selected to be the target is 10, it is determined that the player has cleared all of the targets when the enthusiasm level parameter of each of these spectators has reached the maximum value. In this case, the type of final stage effect is changed corresponding to the number of targets that have been cleared. For example, when the player has cleared all of the ten targets, the most impressive effect is produced in the last stage. When the player has cleared eight targets, a more impressive effect is produced as compared with the case where the player has cleared five targets, for example.

The rating system that utilizes the second rating process is a rating system that utilizes detection of the pitch and the rhythm of the player. In this case, the player is rated by means of the addition of points that is not expressly presented to the player. More specifically, whether or not the player has sung to the rhythm is determined (rated). For example, points are added when the player has sung to the designated bass/drum timing. The long-tone skill, the accuracy of the rest, and the like are also rated. The accuracy of the pitch is also rated. Specifically, the pitch of the player is determined, and the correct pitch is graphically displayed. When a state in which the player does not sing has continued for a given time, most of the spectators perform a standby motion, and points are not added to the player during such a period.

When the performance of the player has ended, and the rating result for the live performance of the player meets a given standard, the audience calls for an encore. In this case, the player can play a further tune. When the live performance has ended, the stage becomes darker while a cheer from the audience becomes smaller in volume, and the game ends. A message "Well done! Remove HMD" is then produced by means of a text and sound. The player removes the equipment in response to the message, and leaves the private room. The game play is thus completed.

2.4 First Game Process and Second Game Process

The game processing method according to one embodiment of the invention that is suitable for the game described above with reference to FIGS. 6 to 8 is described below. In one embodiment of the invention, a first game process that uses the input information that has been input using the input device 160, and a second game process that uses the line-of-sight information are performed, and the game result achieved by the player is rated using the result of the first game process and the result of the second game process.

Figure 10A:
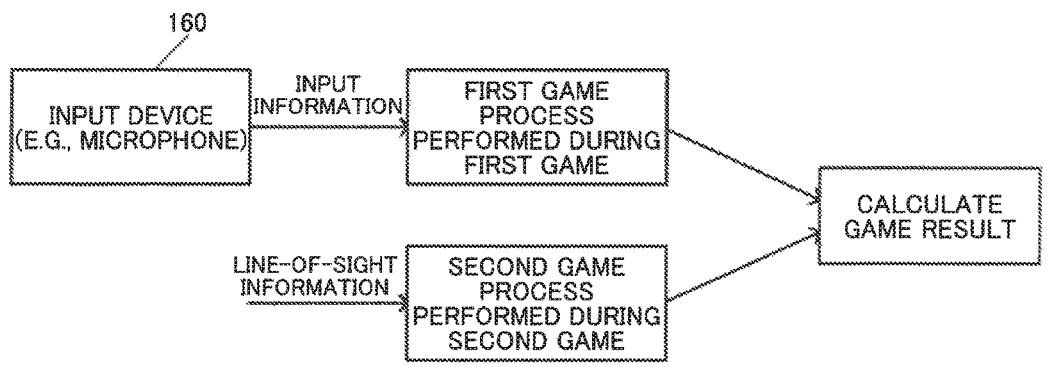
FIGS. 10A and 10B are views illustrating a method according to one embodiment of the invention.

As illustrated in FIG. 10A, the line-of-sight information about the player who wears the HMD 200, and the input information that that has been input by the player using the input device 160, are acquired. For example, the input processing section 102 illustrated in FIG. 1 acquires the line-of-sight information and the input information (that has been input using the input device 160). The line-of-sight information is information that represents the line-of-sight direction of the player, for example. The line-of-sight information can be acquired by the tracking process described above, or the like. For example, the line-of-sight information about the player can be determined by calculating the direction information about the HMD 200 using the tracking process. The input information that has been input using the input device 160 is the performance information (vocal performance or musical instrument performance) that has been input by the player by playing a performance, for example.

As illustrated in FIG. 10A, the first game process that allows the player to play the first game is performed based on the input information (e.g., voice information detected by a microphone) from the input device 160. The second game process that allows the player to play the second game is performed based on the line-of-sight information that represents the line-of-sight direction of the player. The game result achieved by the player is calculated based on the result of the first game process and the result of the second game process. For example, the game result (overall or final game result) of the player is calculated based on the rating result with respect to the game play performed by the player during the first game process, and the rating result with respect to the game play performed by the player during the second game process.

For example, the first game is a music game in which the game process is performed based on the performance information (i.e., input information) about the player. For example, when the game is a music game in which the player sings, the performance information (i.e., input information) is voice information about the player. When the game is a music game in which the player plays a musical instrument, the performance information (i.e., input information) is musical instrument sound information that is generated by a musical instrument (or a device that imitates a musical instrument) that is played by the player, for example.

The second game is a game in which the game process is performed based on the line-of-sight relationship information that represents the relationship between the line of sight of the player and the target. For example, the second game is a game in which the game play performed by the player is rated based on whether or not the player has turned the line of sight (line-of-sight direction) to the target. More specifically, the game process is performed during the second game based on the line-of-sight relationship information that represents the relationship between the line of sight of the player and a spectator (i.e., target).

Figure 10B:
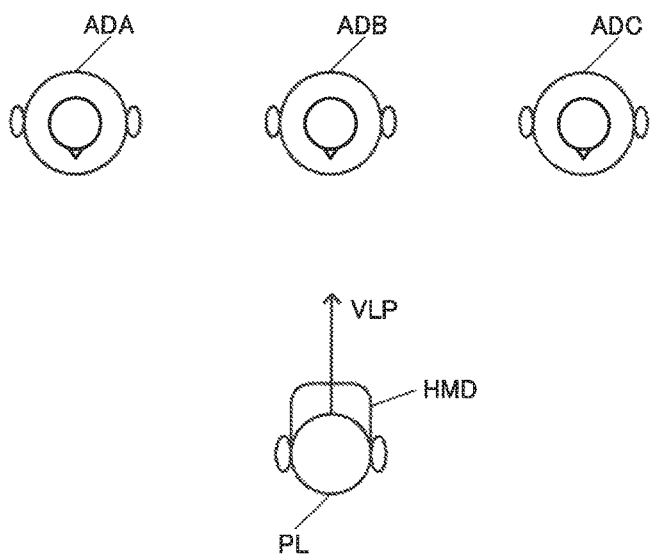

In the example illustrated in FIG. 10B, a spectator ADB among spectators ADA, ADB, and ADC in the audience is set to be the target. In this case, the game process is performed based on the line-of-sight relationship information that represents the relationship between the line of sight VLP of the player PL who wears the HMD, and the spectator ADB (i.e., target), to rate the game play performed by the player. More specifically, the game play performed by the player is highly rated when the line of sight VLP of the player PL has intersected the spectator ADB.

In the example illustrated FIG. 6, the spectator AD4 that appeals to the player is the target with respect to the line of sight of the player. When the player has sung while gazing at the spectator AD4, the game play performed by the player is highly rated.

Figure 11A:
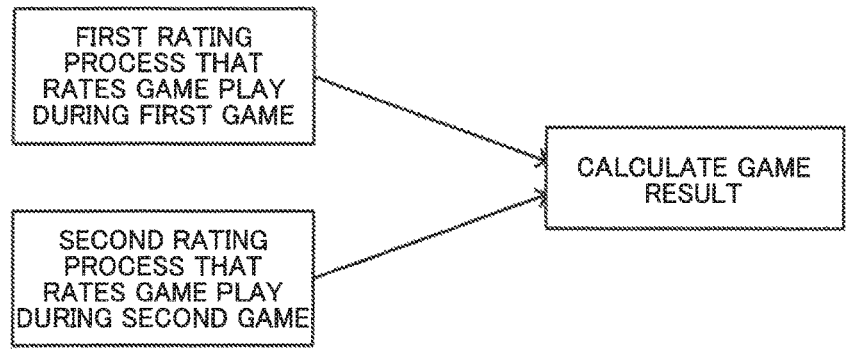
FIGS. 11A to 11C are views illustrating a method that rates game play performed by a player during a first game and a second game.

In one embodiment of the invention, the first rating process that rates the game play performed by the player during the first game, and the second rating process that rates the game play performed by the player during the second game, are performed (see FIG. 11A). The game result (overall or final game result) of the player is calculated based on the result of the first rating process and the result of the second rating process.

Specifically, the first rating process that rates the game play performed by the player is performed during the first game in which the game process is performed based on the input information (e.g., performance information) from the input device 160. For example, the rating process that rates the performance of the player is performed during the first game that is a music game.

The second rating process that rates the game play performed by the player is performed during the second game in which the game process is performed based on the line-of-sight information about the player. For example, the player PL plays the second game so that the line of sight VLP intersects the spectator ADB (i.e., target) (see FIG. 10B), and the second rating process that rates the game play performed by the player PL is performed. For example, when the player PL has played a vocal performance or the like while gazing at the spectator ADB, the game play performed by the player is rated, and the game play performed by the player is highly rated by the second rating process.

The game result achieved by the player is calculated based on the result of the first rating process and the result of the second rating process. For example, the final game result (e.g., points or score) achieved by the player is calculated by comprehensively judging the result of the first rating process and the result of the second rating process.

Figure 11B:
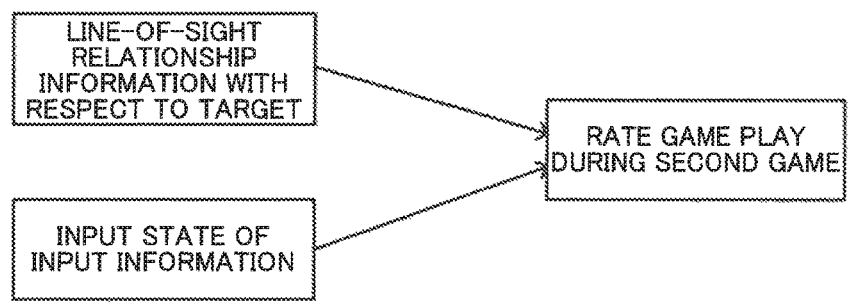

More specifically, the second rating process rates the game play performed by the player during the second game based on the line-of-sight relationship information that represents the relationship between the line of sight of the player and the target, and the input state of the input information by the player during the first game (see FIG. 11B).

For example, when the player PL has input the performance information (i.e., input information) in a state in which the line of sight VLP intersects the spectator ADB (i.e., target) (see FIG. 10B), the game play performed by the player during the second game is highly rated. For example, when it has been determined that the player PL has sung in a state in which the line of sight VLP intersects the spectator ADB, the game play performed by the player during the second game is highly rated.

Figure 11C:
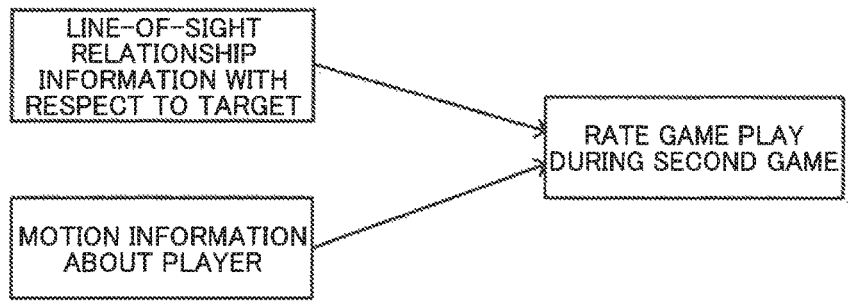

As illustrated in FIG. 11C, the second rating process may rate the game play performed by the player during the second game based on the line-of-sight relationship information that represents the relationship between the line of sight of the player and the target, and the motion information about the player.

For example, when it has been detected based on the motion information that the player PL has performed a given motion (action) in a state in which the line of sight VLP of the player PL intersects the spectator ADB (i.e., target) (see FIG. 10B), the game play performed by the player during the second game is highly rated. For example, when it has been determined that the player PL has performed a given motion in a state in which the line of sight VLP intersects the spectator ADB, the game play performed by the player during the second game is highly rated. More specifically, when it has been determined that the player PL has performed a given motion (e.g., a motion that raises the arm) in response to a cheer from the spectator ADB, or the motion of the spectator ADB, the game play performed by the player during the second game is highly rated. The motion information about the player can be acquired by detecting the position and the direction of the input device 160 (input device 160-1 or 160-2) illustrated in FIG. 2A, for example.

In one embodiment of the invention, the value of the parameter that is set to the target with respect to the line of sight of the player is changed based on the result of the game play performed by the player during the second game. The result of the second rating process is calculated based on at least one of the value of the parameter and the number of targets for which the parameter has reached a given value.

Figure 12A:
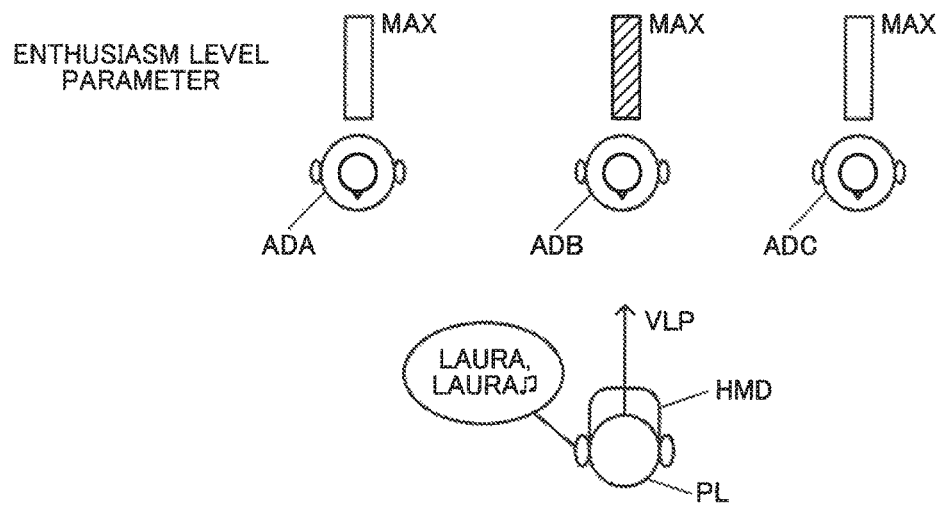
FIG. 12A to 12C are views illustrating a method that rates game play performed by a player during a second game using line-of-sight information.

In the example illustrated in FIG. 12A, the value of the enthusiasm level parameter of the target with respect to the line of sight VLP of the player PL is changed based on the result of the game play performed by the player during the second game. In the example illustrated in FIG. 12A, since the player PL has given a vocal performance in a state in which the line of sight VLP of the player PL intersects the spectator ADB, the enthusiasm level parameter of the spectator ADB has increased. When the enthusiasm level parameter of the spectator ADB has reached the maximum value (given value in a broad sense), the spectator ADB is set to a target clear state.

Figure 12B:
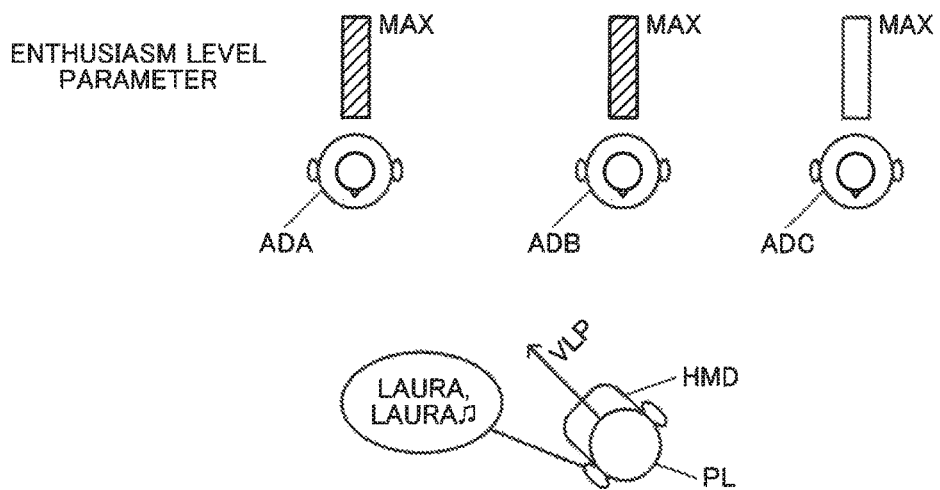

In the example illustrated in FIG. 12B, since the player PL has played a vocal performance in a state in which the line of sight VLP of the player PL intersects the spectator ADA, the enthusiasm level parameter of the spectator ADA has increased. When the enthusiasm level parameter of the spectator ADA has reached the maximum value, the spectator ADA is set to a target clear state.

Figure 12C:
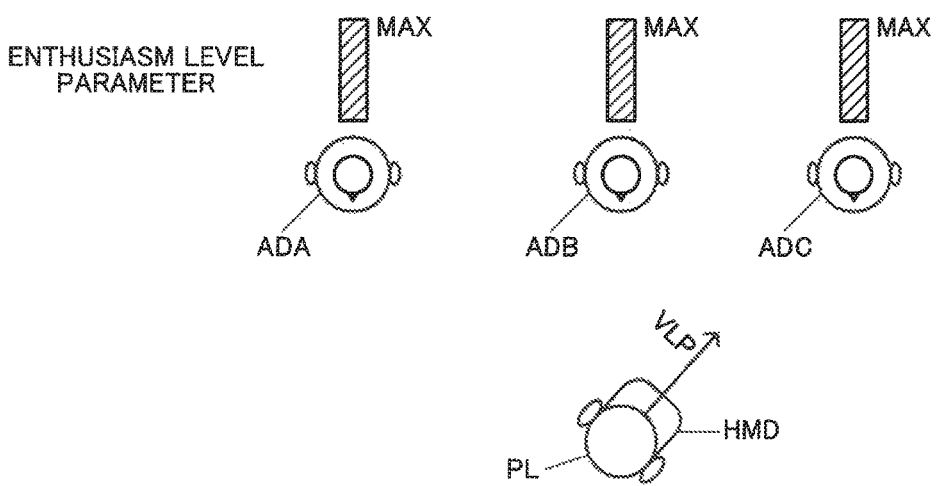

In the example illustrated in FIG. 12C, since the player PL has played a vocal performance in a state in which the line of sight VLP of the player PL intersects the spectator ADC, the enthusiasm level parameter of the spectator ADC has increased.

When the enthusiasm level parameter of the spectator ADC has reached the maximum value, the spectator ADC is set to a target clear state.

When all of the spectators ADA, ADB, and ADC have been set to a target clear state (i.e., the maximum value has been reached), it is determined that all of the targets have been cleared, and the player PL is rated at the highest level (i.e., the highest rating points are given to the player PL). When the number of targets that have been set to a target clear state is "2", the player PL is lowly rated as compared with the case where all of the targets have been set to a target clear state. When the number of targets that have been set to a target clear state is "1", the player PL is lowly rated as compared with the case where the number of targets that have been set to a target clear state is "2".

In the examples illustrated in FIGS. 12A to 12C, the result of the second rating process is thus calculated based on the number of targets for which the enthusiasm level parameter (parameter in a broad sense) has reached the maximum value (given value). Note that the result of the second rating process may be calculated based on the value of the parameter of the target (spectator) instead of the number of targets for which the parameter has reached the maximum value (given value).

The first rating process illustrated in FIG. 11A rates the game play performed by the player during the first game based on at least one of the pitch and the rhythm that are determined based on the performance information (i.e., input information) about the player. For example, the game play performed by the player during the first game is rated in the same manner as in a karaoke game.

Figure 13A:
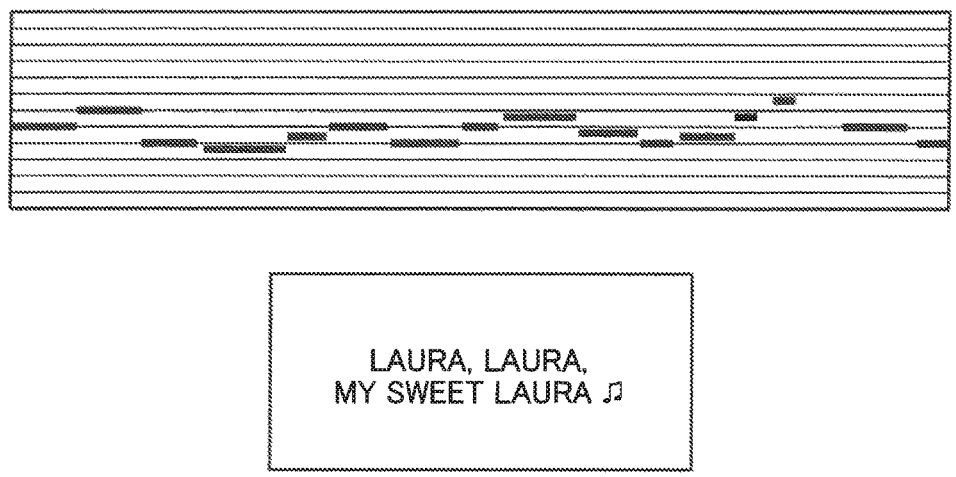
FIGS. 13A and 13B are views illustrating a method that rates game play performed by a player during a first game that is a music game.

For example, the game described above with reference to FIGS. 6 to 8 displays the lyrics and the pitch of the song to the player (see FIG. 13A). The pitch is displayed so that the player can visually determine the pitch used as a reference (example) for the rating process. The player can also determine the rhythm used as a reference (example) for the rating process based on the displayed pitch.

Figure 13B:
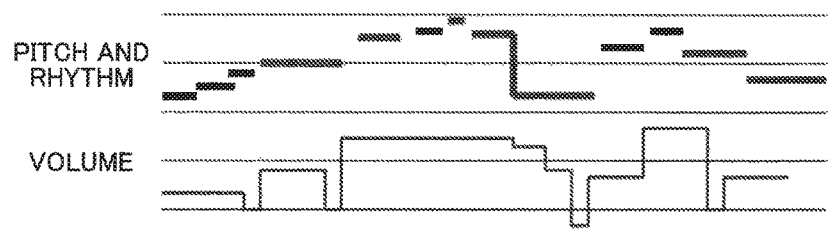

When the player has played a vocal performance, the performance of the player is compared with the pitch-rhythm reference data illustrated in FIG. 13B. More specifically, the pitch-rhythm data of the player is extracted from the vocal performance information about the player. The pitch-rhythm data of the player thus extracted is compared with the pitch-rhythm reference data to rate the game play (vocal performance) performed by the player during the first game (music game). This makes it possible to appropriately rate the singing skill of the player. Note that volume reference data illustrated in FIG. 13B may be provided in addition to the pitch-rhythm reference data, and the volume control skill (inflection) of the player may also be rated.

In one embodiment of the invention, at least one of the value of the parameter that is set to the target (spectator), the change rate of the parameter, the maximum value of the parameter, and the selection condition for the target is changed based on the result of the game play performed by the player during the first game.

Figure 14:
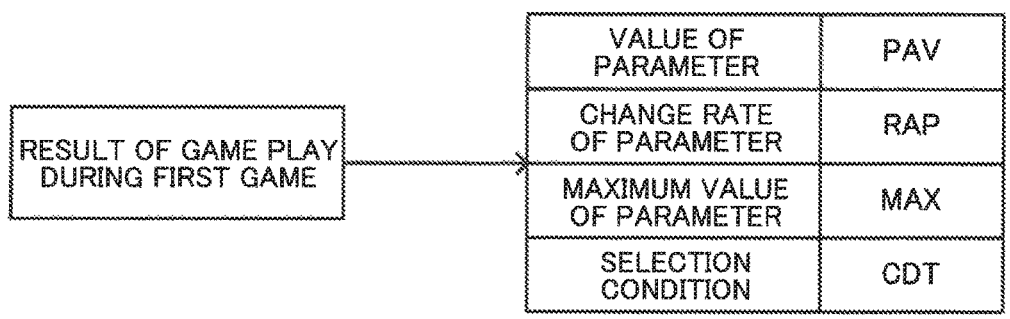
FIG. 14 is a view illustrating a method hat changes the value, change rate, maximum value, and the like of a parameter of a target based on a result of game play performed by a player during a first game.

For example, a parameter such as the enthusiasm level parameter (excitement level parameter) is set to the target (e.g., spectator). As illustrated in FIG. 14, the value PAV of the parameter, the change rate RAP of the parameter, and the maximum value MAX of the parameter are stored in the parameter storage section 176 illustrated in FIG. 1 so as to be linked to each target. The selection condition CDT for the target is also linked to each target.

The value PAV of the parameter is increased when the game play performed by the player during the first game is highly rated. The change rate RAP is increased when the game play performed by the player during the first game is highly rated. The maximum value MAX is decreased when the game play performed by the player during the first game is highly rated. The selection condition CDT for the target is changed in favor of the player when the game play performed by the player during the first game is highly rated. When the first game is a music game, the value PAV of the parameter is increased when the vocal performance of the player is highly rated. In the example illustrated in FIG. 12A, the value of the enthusiasm level parameter is increased. The change rate of the enthusiasm level parameter is increased, the maximum value of the enthusiasm level parameter is increased, and the value of the enthusiasm level parameter easily reaches the maximum value (i.e., the target is easily set to a target clear state).

More specifically, when the player has sung the first bar (e.g., sung a cappella), and the performance is highly rated, the change rate RAP is increased, and the maximum value MAX is decreased. In this case, the value PAV of the parameter is changed at a high change rate RAP in the second or subsequent bar, and the target is easily cleared (i.e., the maximum value MAX is easily reached). The maximum value MAX is decreased, and the target is more easily cleared.

In one embodiment of the invention, the selection condition for the target is changed based on the result of the game play performed by the player during the first game. In the example illustrated in FIG. 6, the spectator AD4 appeals to the player, and only the spectator AD4 is set to be the target during the performance of the player. Specifically, only the spectator AD4 is set to be the selection target. In this case, when the performance of the player in the first bar (or the first several bars) is highly rated, for example, the spectators AD3 and AD5 who have not appealed to the player, then appeal to the player, and the spectators AD2 and AD6 further appeal to the player. Specifically, when the performance of the player is highly rated, the number of spectators that are to be selected by the player increases. The selection condition for the target is the selection target range, for example. The selection target range (i.e., selection condition) is changed based on the result of the game play performed by the player during the first game. Specifically, the selection target range (selection condition in a broad sense) is widened when the game play performed by the player during the first game is highly rated. That is, a spectator that could not be selected to be the target can be selected to be the target (i.e., the selection condition has been changed based on the result of the game play performed by the player during the first game).

In one embodiment of the invention, a process that selects the target is performed during the second game. The value PAV of the parameter, the change rate RAP of the parameter, and the maximum value MAX of the parameter are changed based on the result of the game play performed by the player during the first game after the target has been selected.

Figure 15A:
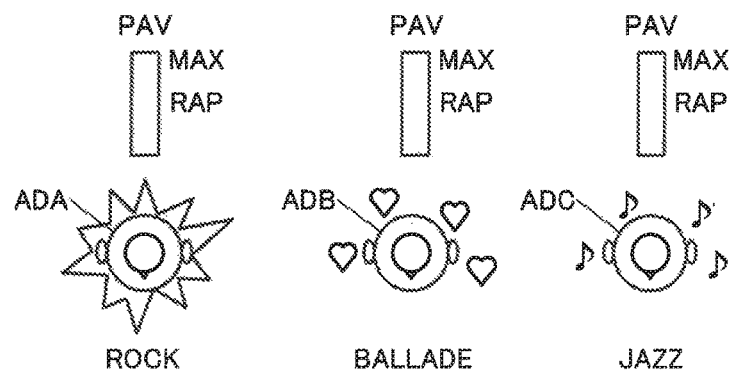
FIGS. 15A and 15B are views illustrating a method hat changes the value, change rate, maximum value, and the like of a parameter of a target based on a result of game play performed by a player during a first game.
Figure 15A:
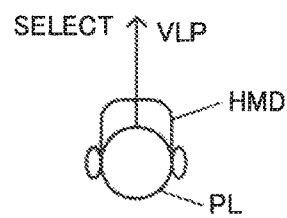

In the example illustrated in FIG. 15A, the player PL selects the target during the second game. In the example illustrated in FIG. 15A, the player PL has selected the spectator ADB by turning the line of sight VLP to the spectator ADB. As described later with reference to FIGS. 17A to 18B and the like, the affinity parameter with respect to the musical composition (genre) is set to the spectators ADA, ADB, and ADC. For example, the affinity parameter is set to the spectators ADA, ADB, and ADC so that the spectators ADA, ADB, and ADC have a high affinity to rock, a ballade, and jazz, respectively. When the player PL is scheduled to sing a ballade during the first game, the player PL selects the spectator ADB having a high affinity with a ballade to be the target by turning the line of sight VLP to the spectator ADB.

Figure 15B:
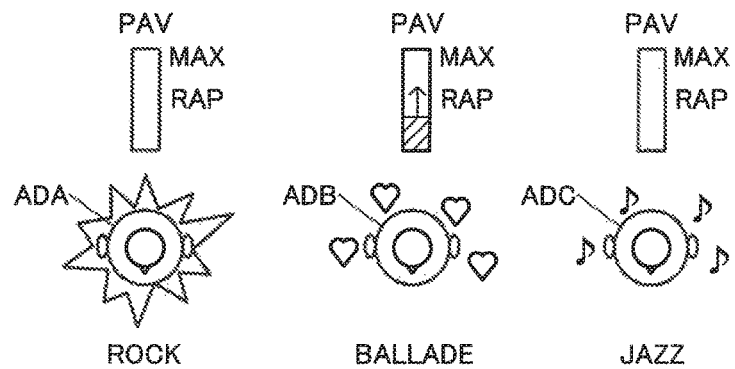
Figure 15B:
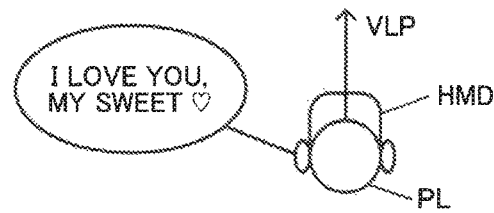

As illustrated in FIG. 15B, the player PL plays the first game that is a music game (vocal performance game) after selecting the target. The value PAV of the parameter is changed based on the result of the game play performed by the player PL during the first game. The change rate RAP and the maximum value MAX are also optionally changed.

In the example illustrated in FIG. 15A, the spectator ADB having a high affinity to a ballade has been selected to be the target. In the example illustrated in FIG. 15B, the player PL sings a ballade. Therefore, the change rate RAP is increased, or the maximum value MAX is decreased, and the target can be easily cleared. In the example illustrated in FIG. 15A, when the spectator ADB having a high affinity to a ballade has been selected, the change rate RAP is increased, or the maximum value MAX is decreased as compared with the case where the spectator ADA having a high affinity to rock, or the spectator ADC having a high affinity to jazz, has been selected. Therefore, it is possible to easily clear the target, and the player PL can advantageously proceed with the game.

In one embodiment of the invention, the value PAV of the parameter, the change rate RAP of the parameter, or the maximum value MAX of the parameter may be changed based on the gaze time information that represents the time for which the player gazes at the target, the gaze distance information that represents the distance between the player and the target when the player gazes at the target, and the selection timing information about the target.

Figure 16A:
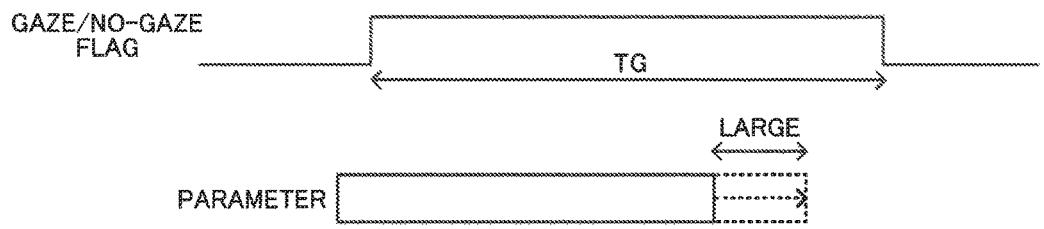
Figure 16B:
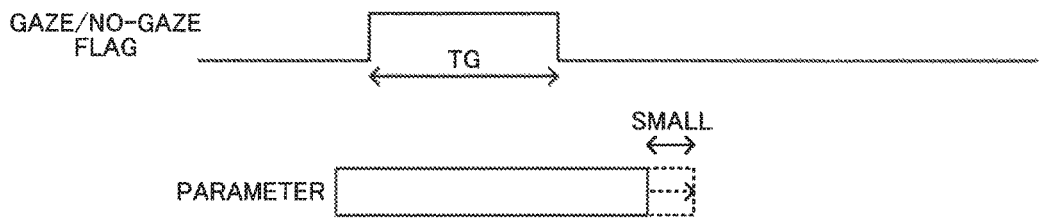

As illustrated in FIGS. 16A and 16B, a gaze/no-gaze flag is set when it has been determined that the player gazes at the spectator set to be the target, for example. The period in which the gaze/no-gaze flag is set corresponds to the gaze time TG.

In the example illustrated in FIG. 16A, the gaze time TG is long. In this case, the player has sung while gazing at the spectator for a long time. Therefore, the change rate RAP (degree of increase) of the parameter is increased. When the change rate RAP has been increased, a change in the value PAV of the parameter increases. On the other hand, the maximum value MAX is decreased.

In the example illustrated in FIG. 16B, the gaze time TG is short. Therefore, the change rate RAP of the parameter is decreased. When the change rate RAP has been decreased, a change in the value PAV of the parameter decreases. On the other hand, the maximum value MAX is increased.

Figure 16C:
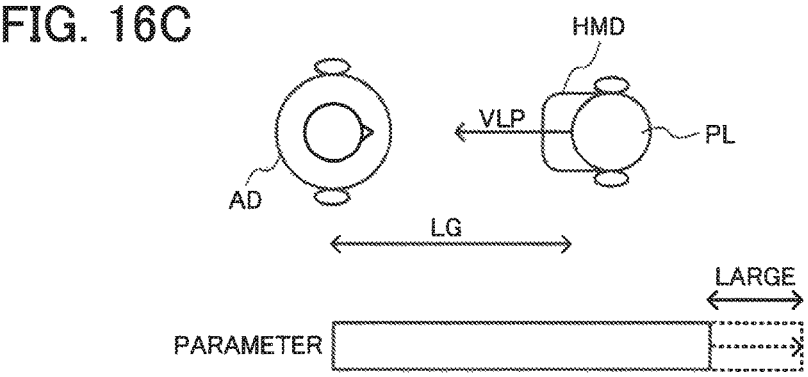

In the example illustrated in FIG. 16C, the gaze distance LG between the player PL and the spectator AD (i.e., target) when the player PL gazes at the spectator AD is short. In this case, the player PL has sung to the spectator AD who is situated near the player PL. Therefore, the change rate RAP of the parameter is increased. When the change rate RAP of the parameter has been increased, a change in the value PAV of the parameter increases. On the other hand, the maximum value MAX is decreased.

Figure 16D:
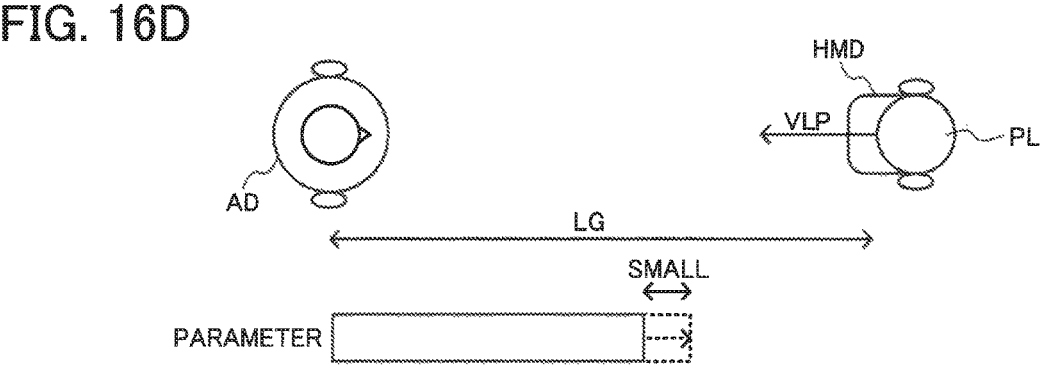

In the example illustrated in FIG. 16D, the gaze distance LG between the player PL and the spectator AD (i.e., target) when the player PL gazes at the spectator AD is long. In this case, the player PL has sung to the spectator AD who is situated away from the player PL. Therefore, the change rate RAP of the parameter is decreased. When the change rate RAP has been decreased, a change in the value PAV of the parameter decreases. On the other hand, the maximum value MAX is increased.

In one embodiment of the invention, the value PAV of the parameter, the change rate RAP of the parameter, or the maximum value MAX of the parameter is changed based on the selection timing information about the target.

In the example illustrated in FIG. 15A, when the spectator ADB has been selected to be the target at an early timing, the change rate RAP is increased. When the change rate RAP of the parameter has been increased, a change in the value PAV of the parameter increases. On the other hand, the maximum value MAX is decreased. Specifically, the player has selected the spectator ADB who likes a ballade that is sung by the player at an early timing. In this case, the change rate RAP is increased, or the maximum value MAX is decreased, so that the player can advantageously play the game.

In the example illustrated in FIG. 15A, when the spectator ADB has been selected to be the target at a late timing, the change rate RAP is decreased. When the change rate RAP has been decreased, a change in the value PAV of the parameter decreases. On the other hand, the maximum value MAX is increased. Specifically, since the player has selected the spectator ADB at a late timing, a disadvantage is put to the game play performed by the player.

In one embodiment of the invention, the affinity parameter is set between the musical composition used during the first game, or the input state of the input information during the first game, and the target with respect to the line of sight of the player. The value PAV of the parameter, the change rate RAP of the parameter, the maximum value MAX of the parameter, or the selection condition CDT for the target is changed based on the affinity parameter.

In the example illustrated in FIG. 17A, affinity parameters AFA1, AFA2, AFA3, and the like are linked to musical compositions (e.g., music (tune) or genre) MS1, MS2, MS3, and the like with respect to the spectator ADA (target). Affinity parameters AFB1, AFB2, AFB3, and the like are linked to the 4 musical compositions MS1, MS2, MS3, and the like with respect to the spectator ADB.

For example, when the spectator ADA has a high affinity to rock music (genre) (see FIG. 15A), and the musical composition MS1 illustrated in FIG. 17A is a rock tune, the affinity parameter AFA1 that is linked to the rock musical composition MS1 is increased as compared with the affinity parameters AFA2 and AFA3.

When the spectator ADB has a high affinity to ballade music (genre) (see FIG. 15A), and the musical composition MS2 illustrated in FIG. 17A is a ballade tune, the affinity parameter AFB2 that is linked to the ballade musical composition MS2 is increased as compared with the affinity parameters AFB1 and AFB3.

In one embodiment of the invention, the value PAV of the parameter, the change rate RAP of the parameter, the maximum value MAX of the parameter, or the selection condition CDT for the target is changed based on the affinity parameter AF (AFA1 to AFA3 and AFB1 to AFB3) (see FIG. 17B). More specifically, the value PAV of the parameter, the change rate RAP of the parameter, the maximum value MAX of the parameter, or the selection condition CDT for the target is changed based on the affinity parameter AF and the result of the game play performed by the player during the first game (music game) (see FIG. 17C).

In the example illustrated in FIG. 15B, the player PL has selected the spectator ADB having a large affinity parameter AFB2 with respect to the ballade musical composition MS2 to be the target by turning the line of sight VLP to the spectator ADB, and sings the ballade musical composition MS2 in the music game (i.e., first game). Therefore, the change rate RAP of the parameter is increased, and a change in the value PAV of the parameter is increased. On the other hand, the maximum value MAX is decreased. Therefore, the player PL can easily cause the spectator ADB to get wildly excited (i.e., easily clear the target (cause the maximum value to be reached)).

In the example illustrated in FIG. 15B, when the player PL has selected the spectator ADA having a large affinity parameter AFA1 with respect to the rock musical composition MS1 to be the target by turning the line of sight VLP to the spectator ADA, and has sung the rock musical composition MS1, the change rate RAP of the parameter is increased, and a change in the value PAV of the parameter is increased. On the other hand, the maximum value MAX is decreased. Therefore, the player PL can easily cause the spectator ADA to get wildly excited (i.e., easily clear the target).

In one embodiment of the invention, the selection condition for the target may be changed based on the affinity parameter.

In the example illustrated in FIG. 6, when the player sings a ballade tune, and only the spectator AD4 has a large affinity parameter with respect to a ballade tune, only the spectator AD4 is the target of the vocal performance of the player, and the selection target range (i.e., the selection condition for the target) is narrow. In this case, only the spectator AD4 is subjected to the target clear process, and the target clear count of the player decreases.

In the example illustrated in FIG. 6, when the player sings a jazz tune, and the spectators AD3, AD4, and AD5 have a large affinity parameter with respect to a jazz tune, the spectators AD3, AD4, and AD5 are the target of the vocal performance of the player, and the selection target range (i.e., the selection condition for the target) is wider than that when the player sings a ballade tune. In this case, the spectators AD3, AD4, and AD5 are subjected to the target clear process, and the target clear count of the player increases as compared with the case where the player sings a ballade tune.

In the example illustrated in FIG. 6, when the player sings a rock tune, and the spectators AD1, AD2, AD3, AD4, AD5, and AD6 have a large affinity parameter with respect to a rock tune, the spectators AD1 to AD6 are the target of the vocal performance of the player, and the selection target range (i.e., the selection condition for the target) is wider than that when the player sings a ballade tune or a jazz tune. In this case, the spectators AD1 to AD6 are subjected to the target clear process, and the target clear count of the player increases as compared with the case where the player sings a ballade tune or a jazz tune.

As described above, the selection target range (i.e., the selection condition for the target) is changed based on the affinity parameter.

In one embodiment of the invention, the affinity parameter may be set between the input state of the input information during the first game, and the target. The input state of the input information refers to the input tempo (input speed) or the input timing pattern of the input information, for example.

For example, when the method according to one embodiment of the invention is applied to a comic dialogue game, the affinity parameter is set between the input tempo of the input information and the spectators of the comic dialogue. When the input tempo of the player's talk or feed during the comic dialogue game is high, the change rate of the excitement parameter of a spectator having a large affinity parameter with respect to a high input tempo is increased. Therefore, the value of the excitement parameter changes to a large extent. In this case, the maximum value of the excitement parameter of a spectator having a large affinity parameter with respect to a high input tempo is also increased.

A reference input timing pattern is provided, and a spectator which has a large affinity parameter with respect to a specific reference input timing pattern is set. The degree of coincidence between the input timing pattern of the player's talk or feed and the specific reference input timing pattern is calculated. When the degree of coincidence is high, the change rate of the excitement parameter of a spectator having a large affinity parameter with respect to the specific reference input timing pattern is increased. Therefore, the value of the excitement parameter changes to a large extent. In this case, the maximum value of the excitement parameter of a spectator having a large affinity parameter with respect to the specific reference input timing pattern is also increased.

When the method according to one embodiment of the invention is applied to a monster battle game, the input information during the first game is information about an attack input with respect to a monster. The affinity parameter with respect to a high-input-tempo attack is increased with respect to a small monster. When the player has performed an attack input at a high tempo, the amount of damage to the monster is increased. The affinity parameter with respect to a low-input-tempo, long-stroke attack is increased with respect to a large monster. When the player has performed a long-stroke attack input at a low tempo, the amount of damage to the monster is increased.

In one embodiment of the invention, it is desirable to perform a display process that displays the affinity parameter in an identifiable manner.

Figure 18A:
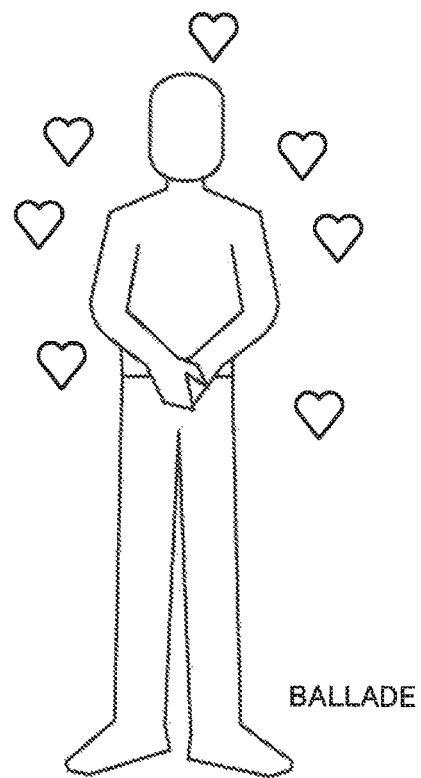
FIGS. 18A and 18B are views illustrating a method that displays an affinity parameter with respect to a target, a musical composition, and the like in an identifiable manner.

FIG. 18A illustrates a display example of a spectator (character) having a large affinity parameter with respect to a ballade tune. As illustrated in FIG. 18A, a heart-shaped visual effect is provided to a spectator having a large affinity parameter with respect to a ballade tune, for example. In this case, the player who has selected a ballade tune can find a spectator provided with the visual effect as illustrated in FIG. 18A from a number of spectators. The player selects the spectator to be the target by turning the line of sight to the spectator, and sings the ballade tune to the spectator. Therefore, the change rate RAP of the parameter is increased, or the maximum value MAX of the parameter is decreased, so that the player can advantageously play the game, for example.

Figure 18B:
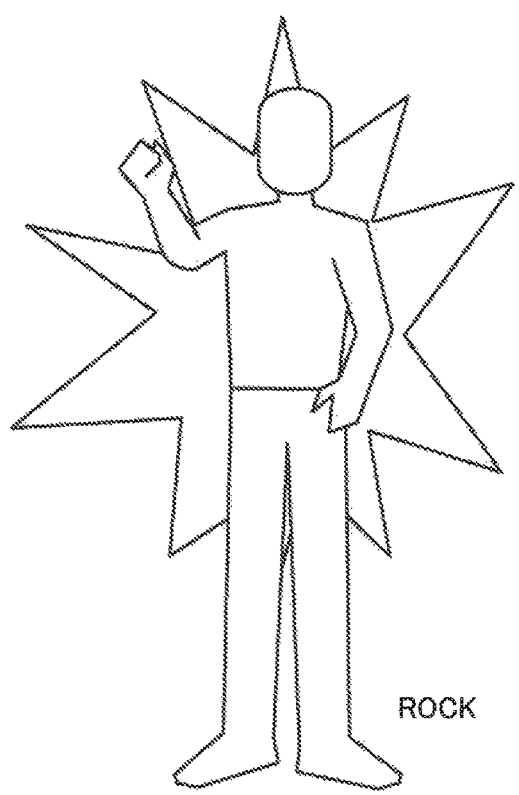

FIG. 18B illustrates a display example of a spectator having a large affinity parameter with respect to a rock tune. As illustrated in FIG. 18B, a frame-shaped (aura-like) visual effect is provided to a spectator having a large affinity parameter with respect to a rock tune, for example. In this case, the player who has selected a rock tune finds a spectator provided with the visual effect as illustrated in FIG. 18B from a number of spectators, and sings the rock tune to the spectator. Therefore, the change rate RAP of the parameter is increased, or the maximum value MAX of the parameter is decreased, so that the player can advantageously play the game.

Note that the display process that displays the affinity parameter in an identifiable manner may be implemented in various ways. For example, the affinity parameter of the target (spectator or character) may be displayed in an identifiable manner by changing the color, the texture, the shape, and the like of the target instead of providing a visual effect (see FIGS. 18A and 18B).

In one embodiment of the invention, when the player has played one of the first game and the second game in a state in which a failure determination has not been made, and then started playing the other of the first game and the second game, the value of the parameter or the change rate of the parameter in the other of the first game and the second game is increased.

When the method according to one embodiment of the invention is applied to a percussion instrument game in which the player plays drums, an operation timing at which the player beat a percussion instrument (or a device that imitates a percussion instrument) is compared with a reference timing. For example, a plurality of timing markers are moved within the screen, and the player performs an operation that beats the percussion instrument at a timing at which each timing marker passes through a determination point (determination line). The operation of the player is rated by comparing the operation timing with the reference timing. For example, the timing marker is moved while playing a musical composition, whether or not the operation timing of the player coincides with the rhythm or the like of the musical composition is rated by determining the operation timing of the player when the timing marker passes through the determination point, and the score or the like of the player is calculated.

More specifically, the operation timing is compared with the reference timing, and the operation of the player is determined to be "success" when the operation timing lies within a given range with respect to the reference timing. On the other hand, the operation of the player is determined to be "failure" when the operation timing does not lie within the given range with respect to the reference timing. The success determination is classified into a plurality of levels (e.g., "Excellent", "Good", and "Fair"). The score (game result) of the player is calculated based on the number of success determinations and the level.

In this case, when a failure determination has not been made, and a success determination has been successively made (i.e., a success determination has been made a given number of times), it is determined that a combo state has been achieved. For example, a combo state is achieved when the player has successfully beaten the percussion instrument successively (e.g., 10 or more times) according to the moving timing marker (e.g., note).

In one embodiment of the invention, when the player has played the first game (e.g., percussion instrument game) in a state in which a failure determination has not been made (combo state), and then started playing the second game, the value of the parameter (e.g., enthusiasm level parameter) or the change rate of the parameter in the second game is increased, for example. For example, the value of the parameter or the change rate of the parameter is increased at a rate higher than a normal rate. The score of the player is calculated based on the value of the parameter and the like. Note that the value of the parameter may be used as the score (game result) of the player. According to this configuration, it is possible to implement a game (e.g., music game) in which a virtuous circle continues until a failure determination is made (i.e., the player fails) so that the player is further involved in the game.

Note that the value of the parameter or the change rate of the parameter in the first game may be increased when the player has played the second game in a state in which a failure determination has not been made (combo state), and then started playing the first game. Alternatively, when it has been determined that the player has played the first part (e.g., several bars) during the first game or the second game in a state in which a failure determination has not been made (combo state), the value of the parameter or the change rate of the parameter in the second part that follows the first part may be increased.

Note that information that represents that a combo state has been achieved, or combo state information may be displayed when a combo state (i.e., a state in which a failure determination has not been made) has been achieved. For example, information that represents a combo count (successive success determination count), points added by a combo, or the like may be displayed as the combo state information.

2.5 First Event and Second Event

The game device according to one embodiment of the invention allows the player to experience virtual reality as if he/she plays a live performance in a concert hall in front of an enthusiastic audience. Since an audience who is enthusiastic about the performance of the player is displayed in front of the player (see FIGS. 6 and 7), the player who gets excited may move toward the audience within the VR space.

Figure 19:
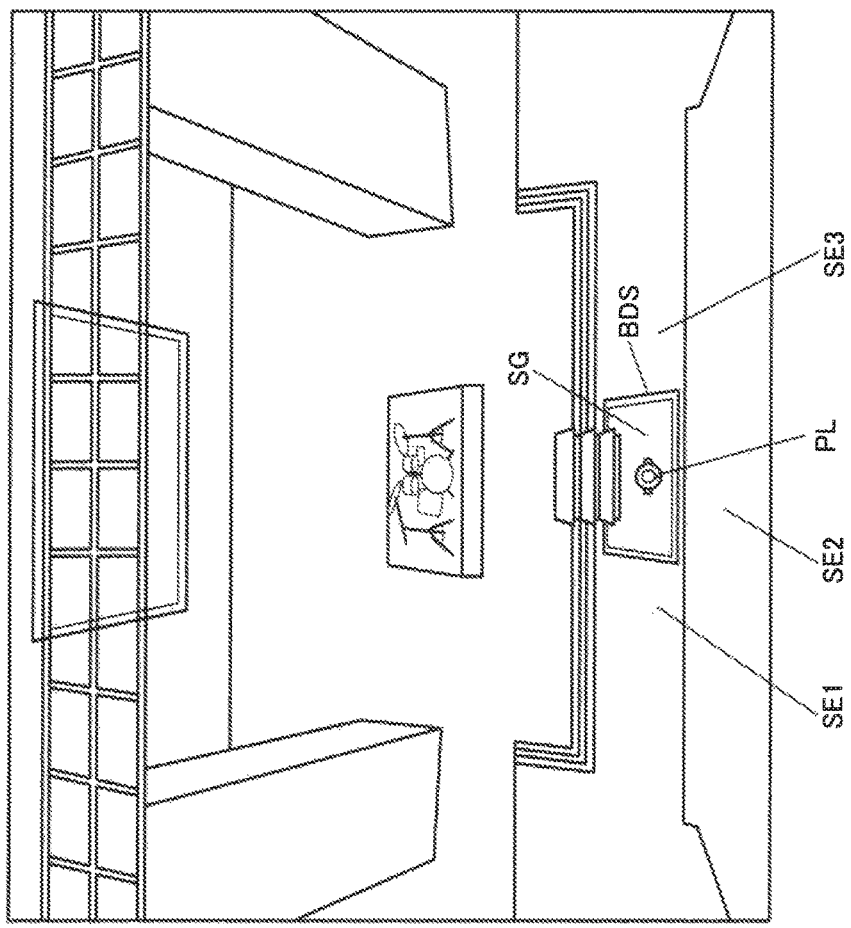
FIG. 19 is a view illustrating the movement of a player on a stage.

FIG. 19 is an overhead view illustrating a stage SG on which a player PL appears (stands) within the VR space. Note that the player PL illustrated in FIG. 19 is a virtual player within the VR space. The player in the real world and the virtual player are herein indicated by the same reference sign "PL" for convenience of explanation.

The stage SG is defined by a boundary BDS, and spectators who perform an action as illustrated in FIGS. 6 and 7 are placed in spectators' seats SE1, SE2, and SE3 situated around the stage SG. The boundary BDS that defines the stage SG corresponds to the boundary BD that defines the area AR within the play area in the real world illustrated in FIG. 4A, for example. The boundary BDS that defines the stage SG within the VR space is set at a position situated inward by a given distance with respect to the boundary BD that defines the area AR in the real world illustrated in FIG. 4A, for example.

Figure 20:
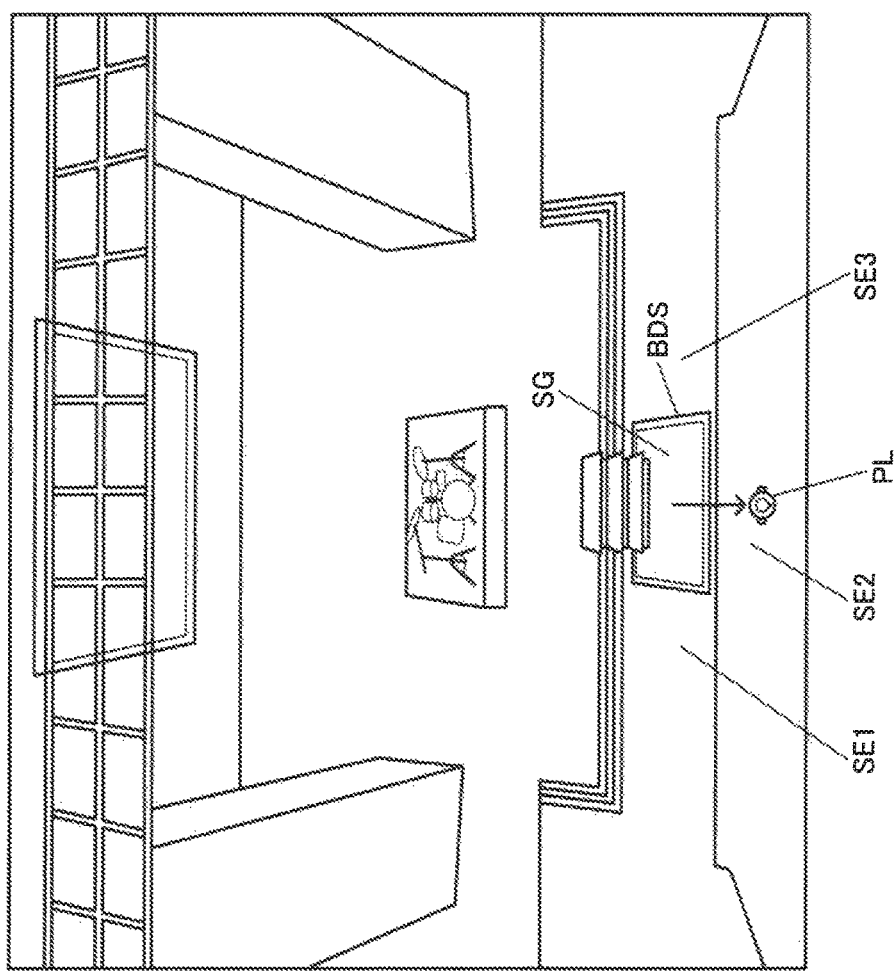
FIG. 20 is a view illustrating the movement of a player on a stage.

In the example illustrated in FIG. 19, the player PL who stands on the stage SG plays a live performance while being surrounded by the spectators (AD1 to AD11) (see FIGS. 6 and 7). In this case, the player PL who has got excited to see the enthusiastic audience (see FIG. 6) may move beyond the stage SG (see FIG. 20) in order to approach the audience.

If such a situation has occurred, the player PL may collide with the wall 301 and the like in the real world illustrated in FIG. 4A (i.e., it is undesirable from the viewpoint of safety).

In one embodiment of the invention, a method that produces a first event and a second event that indicate danger is employed in order to avoid the occurrence of such a situation. Specifically, the occurrence of a situation in which the player collides with a wall is effectively reduced or suppressed while minimizing a situation in which a sense of immersion is impaired due to danger indication by producing an event in two stages.

Figure 21A:
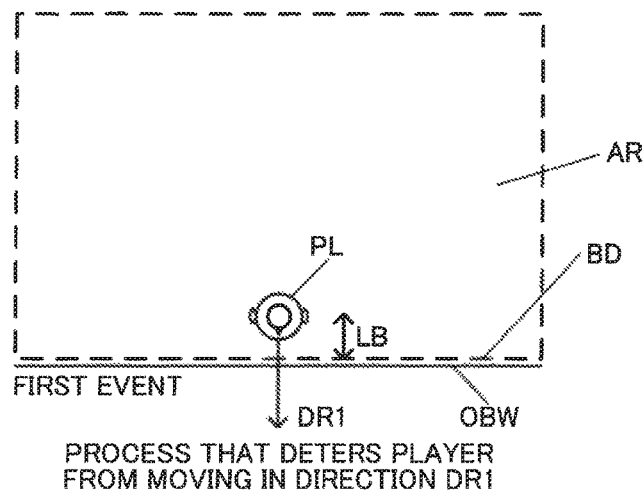
FIGS. 21A to 21C are views illustrating a method that produces a first event and a second event based on the position of a player.

FIG. 21A illustrates an example in which it has been determined that the player PL has approached (or reached) the boundary BD that defines the area AR that is set to the play area (or the game device housing). For example, it is determined that the player PL has approached the boundary BD when the player PL is situated within a distance LB from the boundary BD that defines the area AR. In this case, the first event is produced. When the direction from the player PL to the boundary BD is referred to as "direction DR1", the first event is produced to deter the player PL from moving in the direction DR1 (toward the boundary). For example, the player PL is deterred from moving (stopped) so that the player PL does not move beyond the boundary BD. Therefore, the player PL stops and stands still, or moves backward, or moves to the right or left.

More specifically, a danger indication object OBW is displayed at a position that corresponds to the boundary BD that defines the area AR (i.e., the deterrence process that utilizes the first event is performed). In the example illustrated in FIG. 21A, the danger indication object OBW is displayed at a position that is situated slightly outward from the boundary BD. Note that the danger indication object OBW may be displayed at the position of the boundary BD, or may be displayed at a position that is situated slightly inward from the boundary BD.

Figure 22:
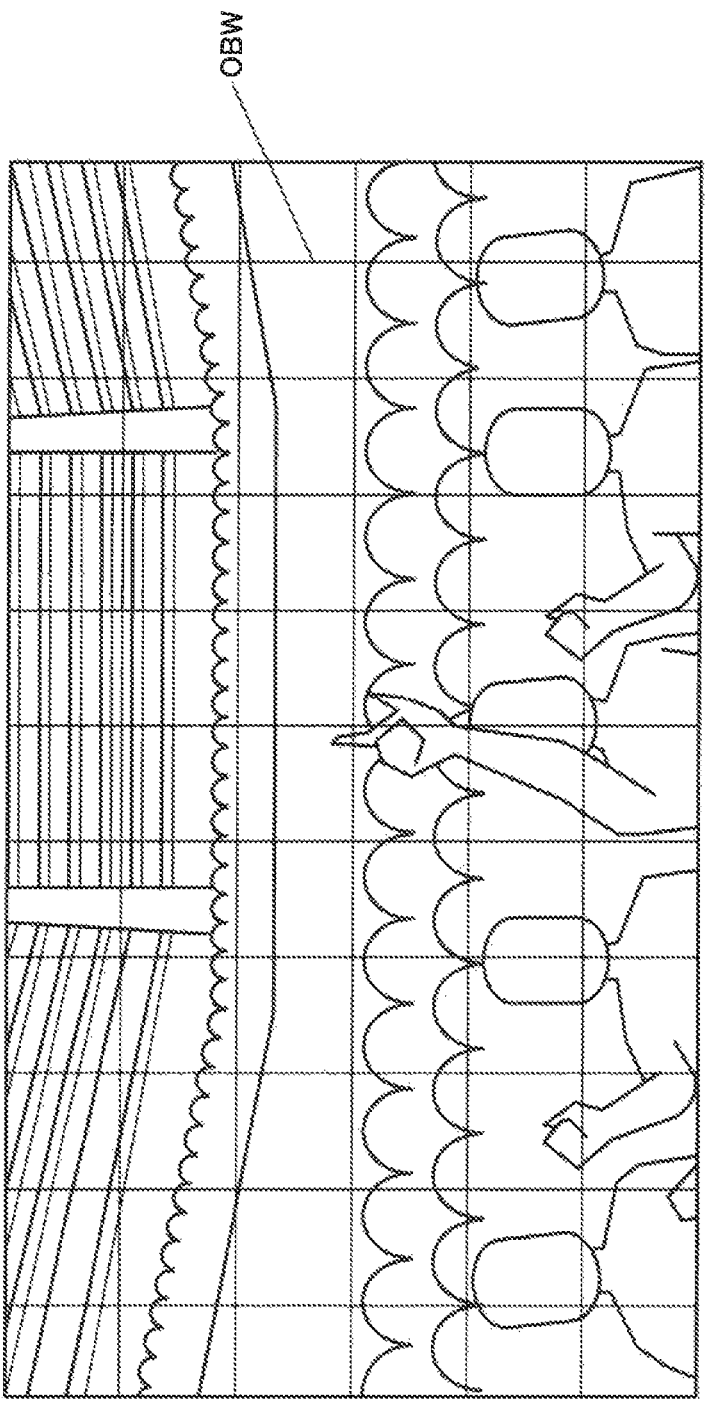
FIG. 22 is a view illustrating a method that displays a danger indication object during a first event.

FIG. 22 illustrates an example of the danger indication object OBW. The danger indication object OBW illustrated in FIG. 22 is a wireframe wall object (mesh-like object). When such a danger indication object OBW is displayed, it is considered that the player gives up on moving in the direction DR1 (toward the boundary) illustrated in FIG. 21A, and stops and stands still, or moves in the direction opposite to the direction DR1, for example. Since the danger indication object OBW is a mesh-like object, the player can see the image of the audience and the like. Therefore, it is possible to minimize a situation in which a sense of immersion in the game is impaired due to danger indication. Note that another example of the deterrence process that utilizes the first event is described later.

The display of the wireframe wall (fence) illustrated in FIG. 22 matches (does not impair or adversely affect) the world implemented by the music game described above with reference to FIGS. 6 to 8. Therefore, it is possible to minimize a situation in which the player feels unnatural even when such a wireframe wall is displayed. Specifically, it is desirable that the danger indication object that is displayed when the player has approached or reached the boundary of the area have a shape, a color, or a material that matches the game world. When the danger indication object matches the game world, the danger indication object can be displayed directly at a timing at which the player has approached or reached the boundary. The danger indication object may be displayed when the player has approached or reached the boundary so that the danger indication object gradually changes from a transparent state to an opaque state in order to reduce a situation in which the player feels unnatural. Alternatively, the danger indication object may be displayed so that the danger indication object gradually changes from an opaque state to a transparent state, and disappears when the player has returned to the original (previous) position.

Figure 21B:
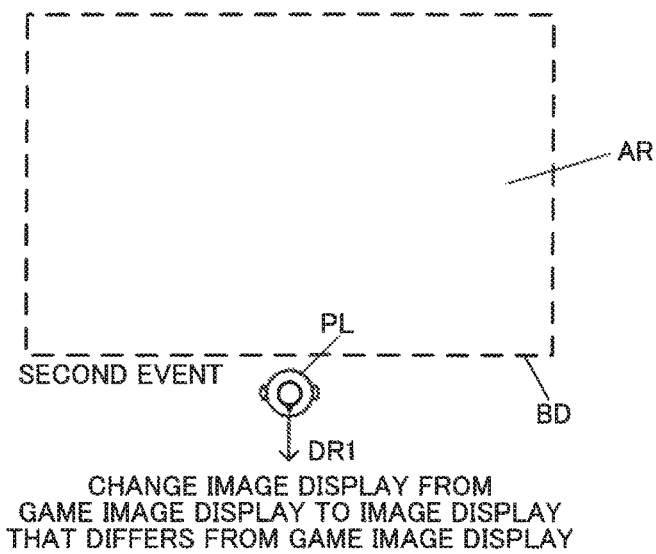

When the player has got excited through the live performance, the player may not stop moving in the direction DR1 even when the deterrence process that utilizes the danger indication object OBW is performed. In one embodiment of the invention, the second event is produced when it has been detected that the player PL has moved beyond the boundary BD that defines the area AR (see FIG. 21B). The second event is produced to change the image display from the game image display to image display that differs from the game image display. For example, the image quality of the game image is significantly decreased, or an image that completely differs from the game image is displayed. Note that the second event may be produced to change the output mode of the game sound. For example, the volume of the game sound may be lowered.

When it has been detected that the player PL has moved in a direction DR2 (inward direction) so as to move beyond the boundary BD that defines the area AR after the second event has been produced, the display of an image that differs from the game image is returned to the display of the game image. For example, the image quality of the game image is returned to the original image quality. Alternatively, the game image is displayed instead of an image that differs from the game image. In this case, the output mode of the game sound may be returned to the original mode. For example, the volume of the game sound is returned to the original volume.

Figure 23:
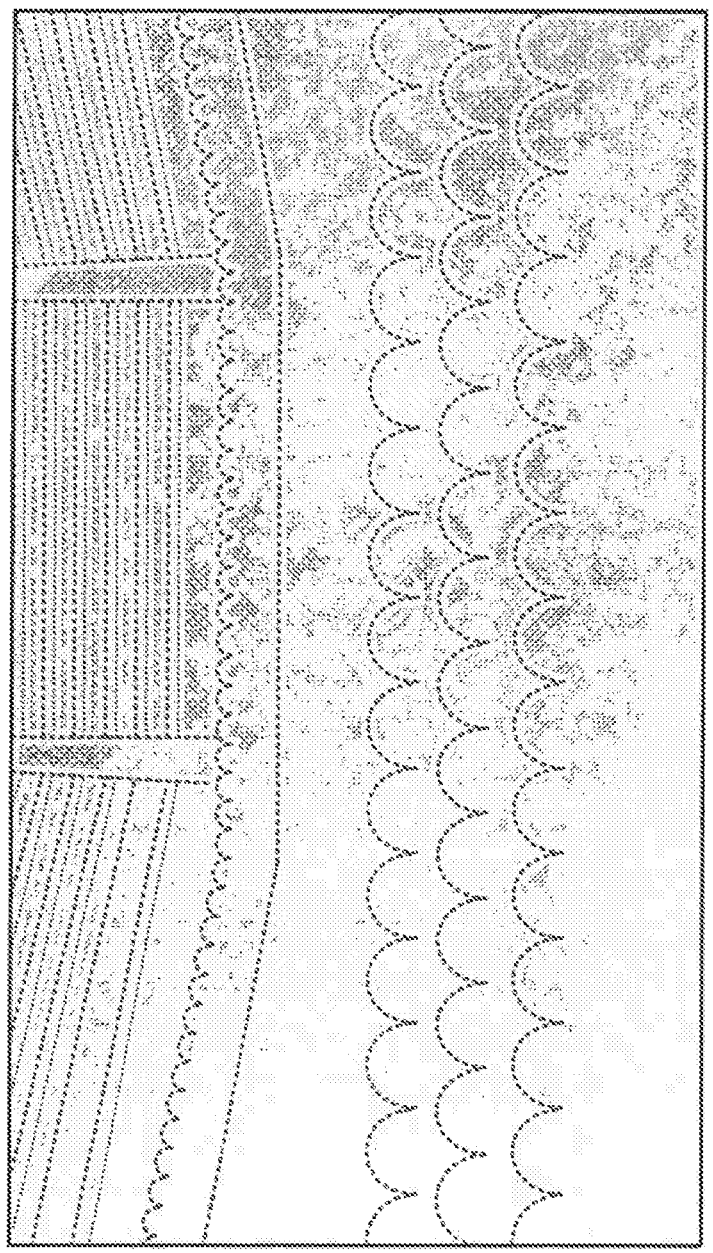
FIG. 23 is a view illustrating a method that decreases the image quality of a game image during a second event.

FIG. 23 illustrates an example of the game image that has been decreased in image quality. The game image illustrated in FIG. 23 has the features (feature quantities) of the normal game image (see FIG. 6 and the like), but has been subjected to a process that decreases the brightness, the saturation, the contrast, or the resolution of the game image, a process that defocuses (blurs) the game image, or the like. For example, the image of the audience and the spectators' seats is unclear (defocused or blurred), and the entire image id dark. Note that it is desirable to give an alarm that urges the player to return to the original (previous) position (see FIG. 4A) using a text image or a sound when the image illustrated in FIG. 23 is displayed.

The image quality of the game image can be easily decreased (see FIG. 23) by performing known image processing on the game image (rendering image), for example. For example, the game image that has been decreased in image quality (see FIG. 23) can be generated by subjecting the original game image to a filtering process that decreases brightness, saturation, or contrast, a filtering process that implements a mosaic process, or the like. Alternatively, an RGB color game image may be converted into a black-and-white image or the like, and the resulting image may be displayed.

For example, if a white image is displayed over the entire screen instead of displaying the image as illustrated in FIG. 23, the player may lose his/her bearings and the sense of direction. Specifically, since the player wears the HMD 200, the player may lose his/her bearings and the sense of direction if a white image is displayed over the entire field of view since a display object that is used to determine the position and the direction is absent.

On the other hand, the game image illustrated in FIG. 23 that has been decreased in image quality maintains the contours (feature quantities) of the display objects such as the audience and the spectator's seats. Therefore, the player can maintain his/her bearings and the sense of direction by utilizing the positions of these display objects as a reference. In the example illustrated in FIG. 23, since the game image is still displayed although the image quality is decreased, the player's sense of immersion in the game is not impaired to a large extent. It is considered that the player who has got excited will recover a calm state of mind as a result of decreasing the image quality of the game image.

Figure 21C:
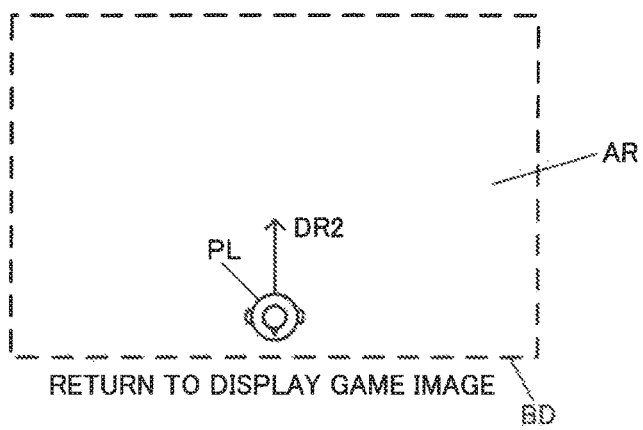

The image quality of the game image is returned to the original image quality when the player PL has turned back, and moved toward the original (previous) position (see FIG. 21C). Specifically, since the original high-quality game image is displayed after the game image illustrated in FIG. 23 that has been decreased in image quality is displayed instantaneously, it is possible to minimize a decrease in the player's sense of immersion in the game.

2.6 Example of Process

An example of the process according to one embodiment of the invention is described below using flowcharts illustrated in FIGS. 24 and 25.

Figure 24:
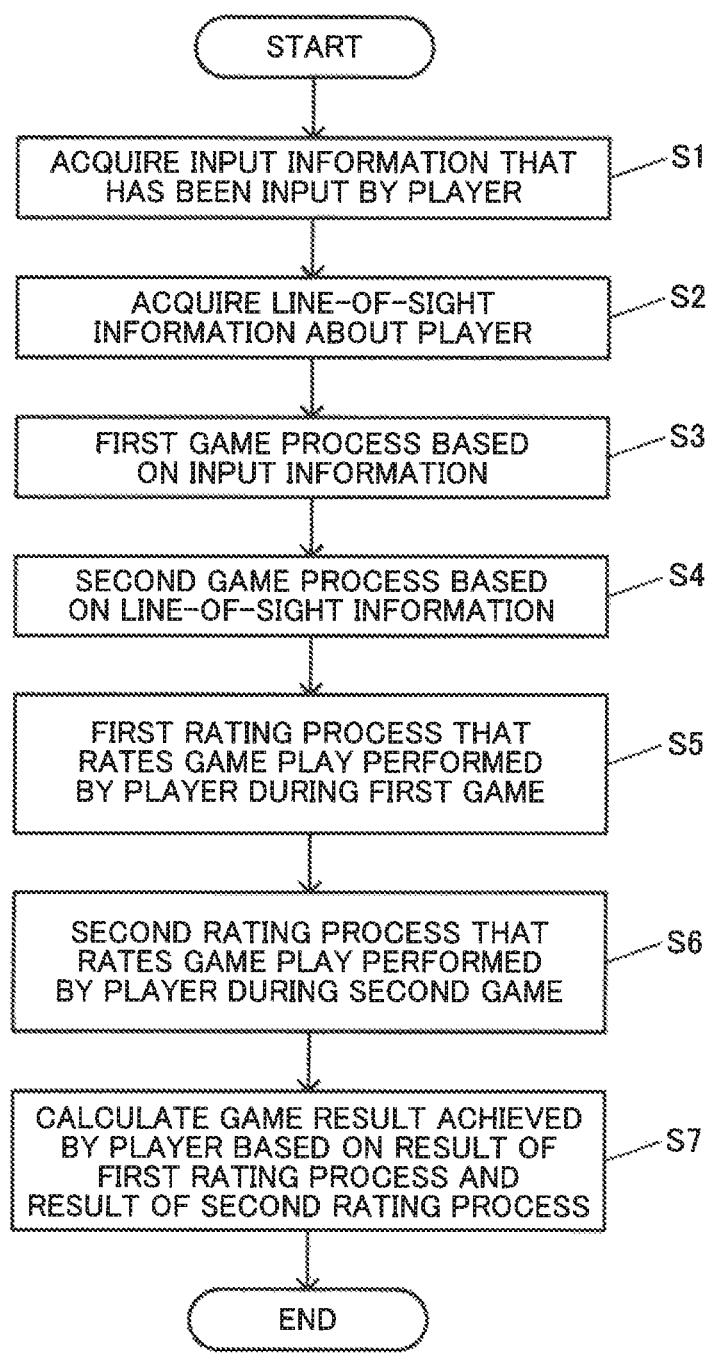
FIG. 24 is a flowchart illustrating a detailed example of a process according to one embodiment of the invention.

FIG. 24 is a flowchart illustrating an overall process according to one embodiment of the invention. The input information that has been input by the player is acquired (step S1). For example, the performance information about the player that has been input during a music game is acquired as the input information. The line-of-sight information about the player is acquired (step S2). For example, the line-of-sight information is acquired using the tracking process (described above) or the like. The first game process based on the input information, and the second game process based on the line-of-sight information, are performed (steps S3 and S4). For example, the first game that is implemented by the first game process is a music game, and the second game that is implemented by the second game process is a game in which the player sequentially clears the target by turning the line of sight to the target.

The first rating process that rates the game play performed by the player during the first game is performed (step S5). The second rating process that rates the game play performed by the player during the second game is performed (step S6). The first rating process rates the performance of the player during a music game, for example. The second rating process rates the game play performed by the player during a game in which the player plays the game while gazing at the target. The game result achieved by the player is calculated based on the result of the first rating process and the result of the second rating process (step S7). For example, the overall game result or the final game result achieved by the player is calculated.

Figure 25:
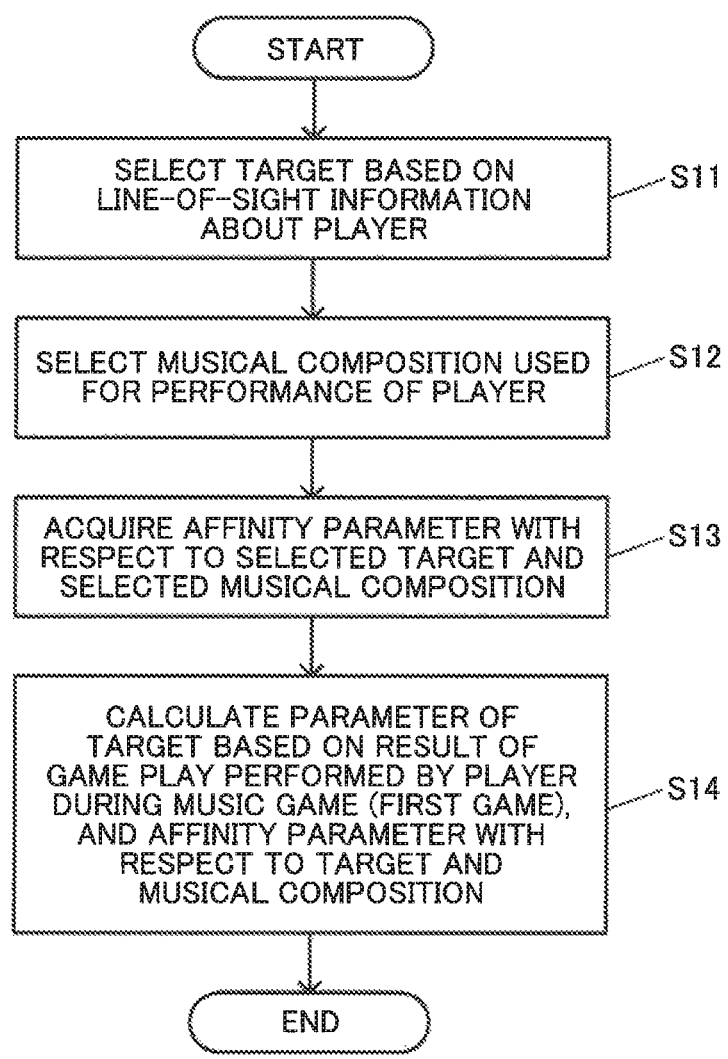
FIG. 25 is a flowchart illustrating a detailed example of a process according to one embodiment of the invention.

FIG. 25 is a flowchart illustrating the process that utilizes the affinity parameter. The target is selected based on the line-of-sight information about the player (step S11). The musical composition used for the performance of the player is selected (step S12). The affinity parameter with respect to the selected target and the selected musical composition is acquired (step S13). For example, the affinity parameter that is linked to the musical composition (see FIG. 17A) is acquired. The parameter of the target is calculated based on the result of the game play performed by the player during the music game (i.e., first game), and the affinity parameter with respect to the target and the musical composition (step S14). For example, the affinity parameter with respect to the spectator ADB (i.e., selected target) and the selected music (ballade) (see FIG. 15A) is acquired. When the player has played the music game (i.e., first game) while singing to the spectator ADB (see FIG. 15B), the enthusiasm level parameter of the spectator ADB is increased based on the result of the performance and the affinity parameter, for example.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The line-of-sight information acquisition process, the position information acquisition process, the first game process, the second game process, the game result calculation process, the first rating process, the second rating process, the display process, and the like are not limited to those described above in connection with the embodiments. Methods equivalent to these methods are intended to be included within the scope of the invention. The invention may be applied to various games. The invention may be applied to various game devices such as an arcade game device, a consumer game device, a large-scale attraction system in which a number of players participate, a simulator, a multimedia terminal, a system board that generates a game image, and a mobile phone. For example, the game device may be a mobile phone or a portable information terminal in which a game program is installed and executed.

What is claimed is:

1. A game device comprising:
    a processor comprising hardware,
    the processor being configured to implement:
    an input process that acquires line-of-sight information about a player who wears a head-mounted display, and input information that has been input by the player using an input device;
    a game process that performs a first game process based on the input information, and performs a second game process based on the line-of-sight information, when a game includes a first game and a second game, the first game process being a process for the player to play the first game, and the second game process being a process for the player to play the second game; and
    a game result calculation process that calculates a game result achieved by the player based on a result of the first game process and a result of the second game process.

2. The game device as defined in claim 1,
    wherein the first game is a timing input game in which the game process is performed based on the input information.

3. The game device as defined in claim 1,
    wherein the second game is a game in which the game process is performed based on line-of-sight relationship information that represents a relationship between a line of sight of the player and a target.

4. The game device as defined in claim 3,
    wherein the second game is a game in which the game process is performed based on the line-of-sight relationship information that represents a relationship between the line of sight of the player and a spectator that is the target.

5. The game device as defined in claim 1,
    wherein the processor implements the game process that performs a first rating process that rates game play performed by the player during the first game, and a second rating process that rates game play performed by the player during the second game, and implements the game result calculation process that calculates the game result achieved by the player based on a result of the first rating process and a result of the second rating process.

6. The game device as defined in claim 5,
wherein the processor implements the game process that performs the second rating process that rates the game play performed by the player during the second game based on line-of-sight relationship information that represents a relationship between a line of sight of the player and a target, and an input state of the input information by the player during the first game.

7. The game device as defined in claim 5,
wherein the processor implements the game process that performs the second rating process that rates the game play performed by the player during the second game based on line-of-sight relationship information that represents a relationship between a line of sight of the player and a target, and motion information about the player.

8. The game device as defined in claim 5,
wherein the processor implements the game process that performs a process that changes a value of a parameter that is set to a target with respect to a line of sight of the player based on a result of the game play performed by the player during the second game, and calculates the result of the second rating process based on at least one of the value of the parameter and a number of the targets for which the parameter has reached a given value.

9. The game device as defined in claim 5,
wherein the processor implements the game process that performs the first rating process that rates the game play performed by the player during the first game based on at least one of a pitch and a rhythm that are determined based on performance information about the player, the performance information being the input information.

10. The game device as defined in claim 1,
wherein the processor implements the game process that performs a process that changes a value of a parameter that is set to a target with respect to a line of sight of the player based on a result of game play performed by the player during the second game.

11. The game device as defined in claim 10,
wherein the processor implements the game process that performs a process that changes at least one of the value of the parameter, a change rate of the parameter, a maximum value of the parameter, and a selection condition for the target based on a result of game play performed by the player during the first game.

12. The game device as defined in claim 11,
wherein a process that selects the target is performed during the second game, and
the processor implements the game process that performs a process that changes at least one of the value of the parameter, the change rate of the parameter, and the maximum value of the parameter based on the result of the game play performed by the player during the first game after the target has been selected.

13. The game device as defined in claim 10,
wherein the processor implements the game process that performs a process that changes at least one of the value of the parameter, the change rate of the parameter, and the maximum value of the parameter based on at least one of gaze time information that represents a time for which the player gazes at the target, gaze distance information that represents a distance between the player and the target when the player gazes at the target, and selection timing information about the target.

14. The game device as defined in claim 10,
wherein an affinity parameter is set between a musical composition that is used during the first game, or an input state of the input information during the first game, and the target with respect to the line of sight of the player, and
the processor implements the game process that performs a process that changes at least one of the value of the parameter, a change rate of the parameter, a maximum value of the parameter, and a selection condition for the target based on the affinity parameter.

15. The game device as defined in claim 1,
wherein an affinity parameter is set between a musical composition that is used during the first game, or an input state of the input information during the first game, and a target with respect to a line of sight of the player, and
the processor implements a display process that displays the affinity parameter in an identifiable manner.

16. The game device as defined in claim 1,
wherein the processor implements the game process that performs a process that, when the player has played one of the first game and the second game in a state in which a failure determination has not been made, and then started playing the other of the first game and the second game, increases at least one of a value of a parameter and a change rate of the parameter in the other of the first game and the second game.

17. A processing method comprising:
an input process that acquires line-of-sight information about a player who wears a head-mounted display, and input information that has been input by the player using an input device;
a game process that performs a first game process based on the input information, and performs a second game process based on the line-of-sight information, when a game includes a first game and a second game, the first game process being a process for the player to play the first game, and the second game process being a process for the player to play the second game; and
a game result calculation process that calculates a game result achieved by the player based on a result of the first game process and a result of the second game process.

18. A non-transitory computer-readable storage medium storing a program that causes a computer to execute a processing method, the processing method comprising:
an input process that acquires line-of-sight information about a player who wears a head-mounted display, and input information that has been input by the player using an input device;
a game process that performs a first game process based on the input information, and performs a second game process based on the line-of-sight information, when a game includes a first game and a second game, the first game process being a process for the player to play the first game, and the second game process being a process for the player to play the second game; and
a game result calculation process that calculates a game result achieved by the player based on a result of the first game process and a result of the second game process.

* * * * *